Figure 41:
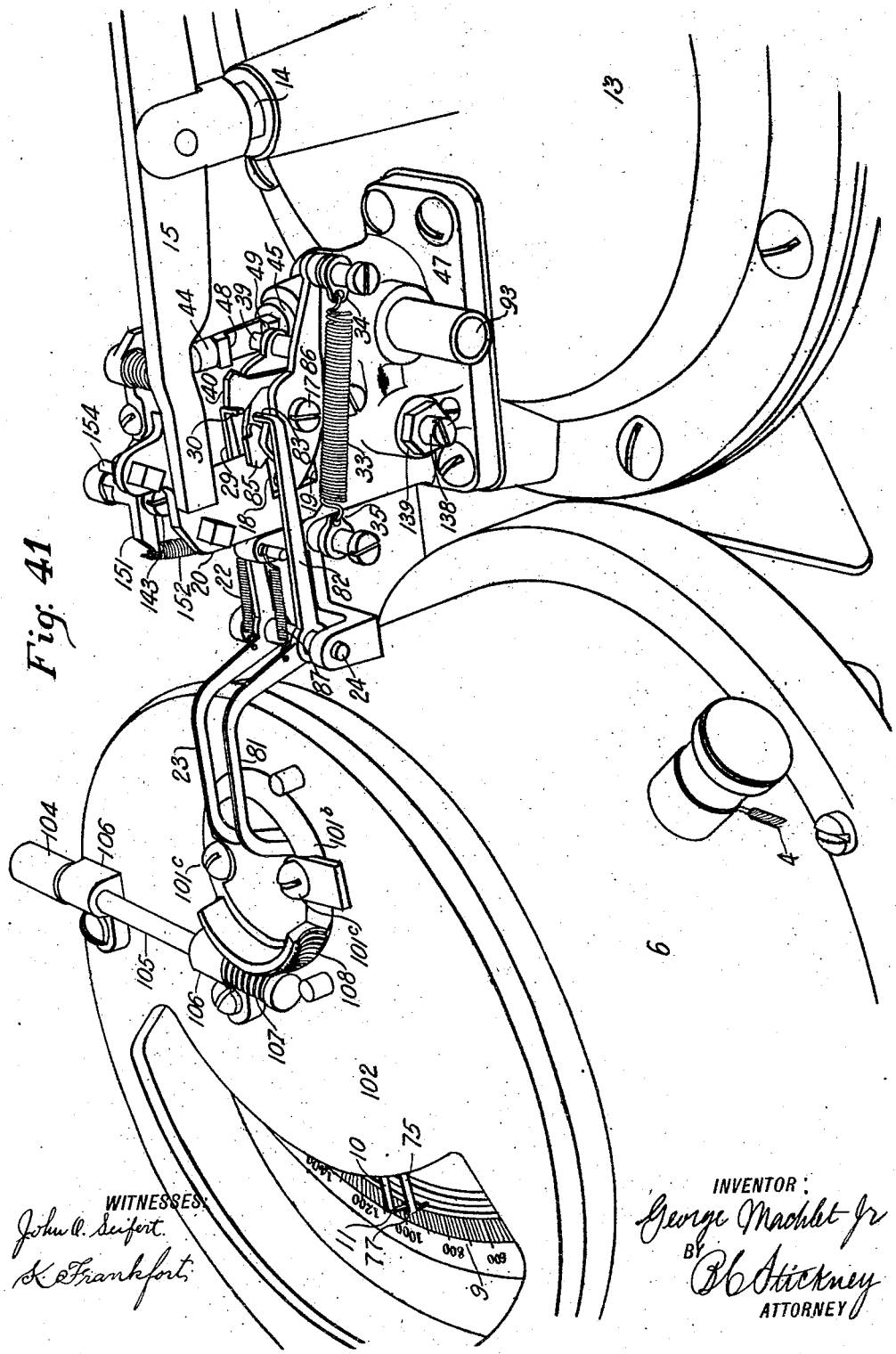

G. MACHLET, Jr.
HEATING APPARATUS.
APPLICATION FILED NOV. 23, 1908.

1,033,816.

Patented July 30, 1912.
10 SHEETS—SHEET 1.

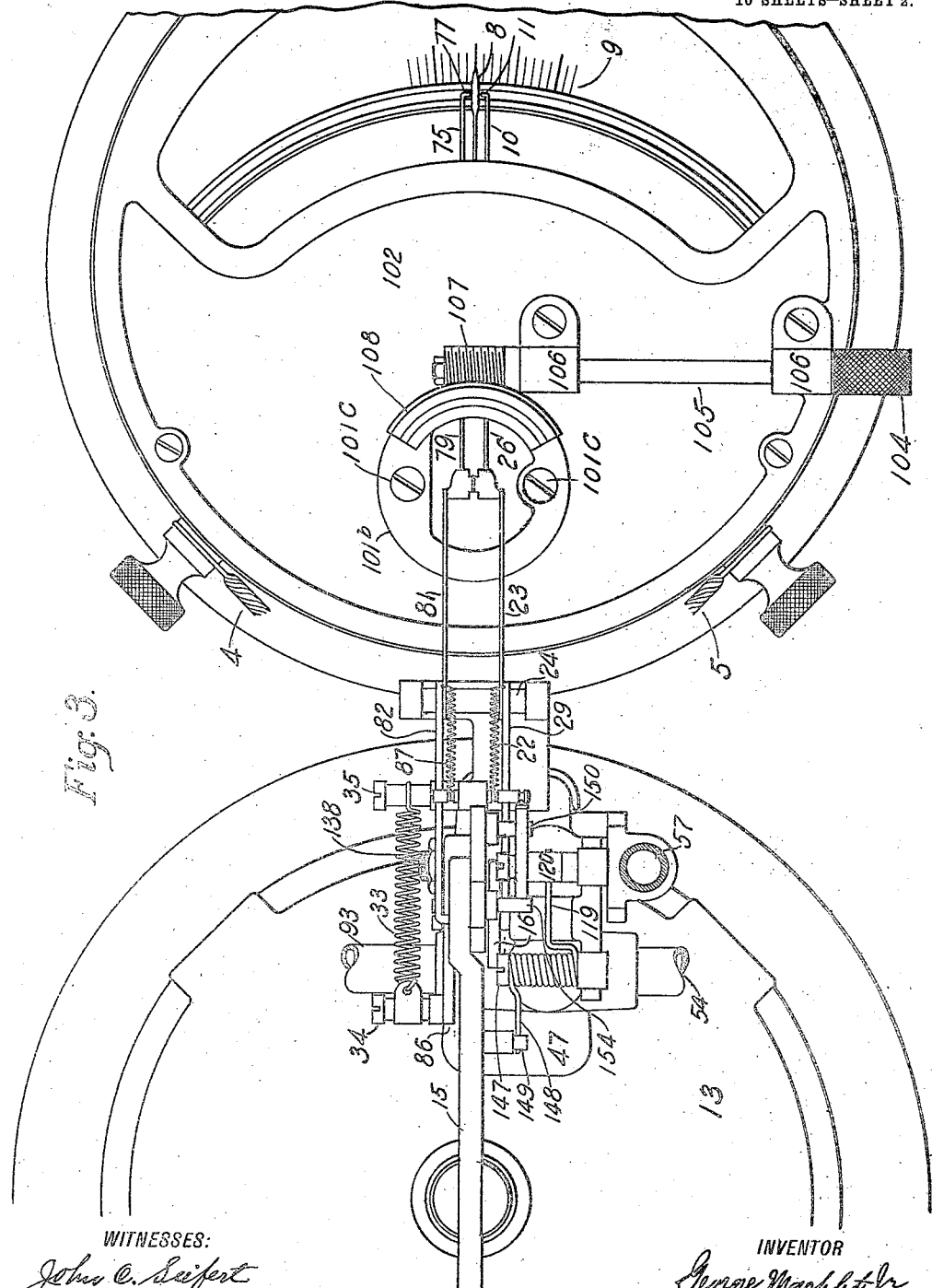

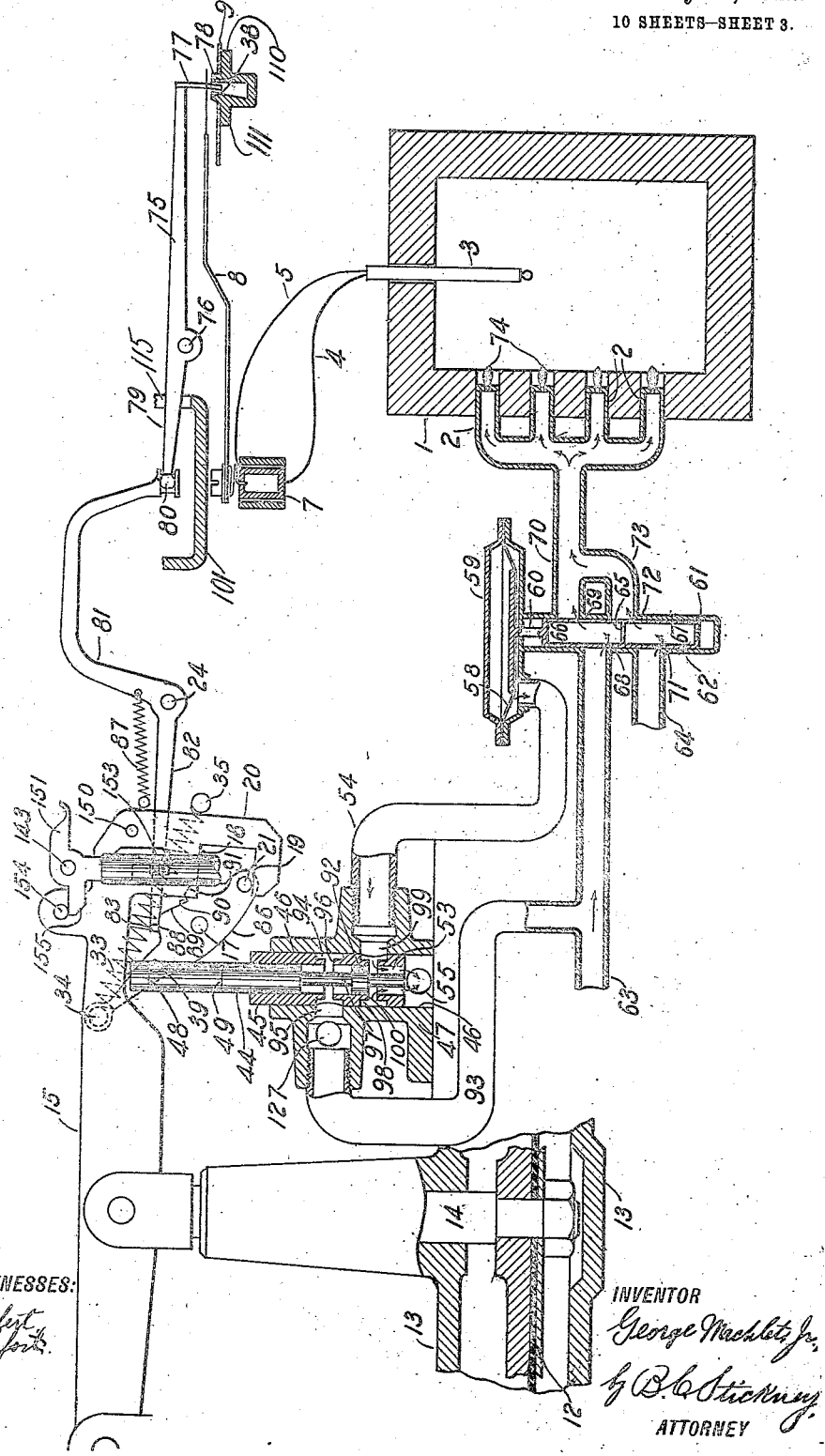

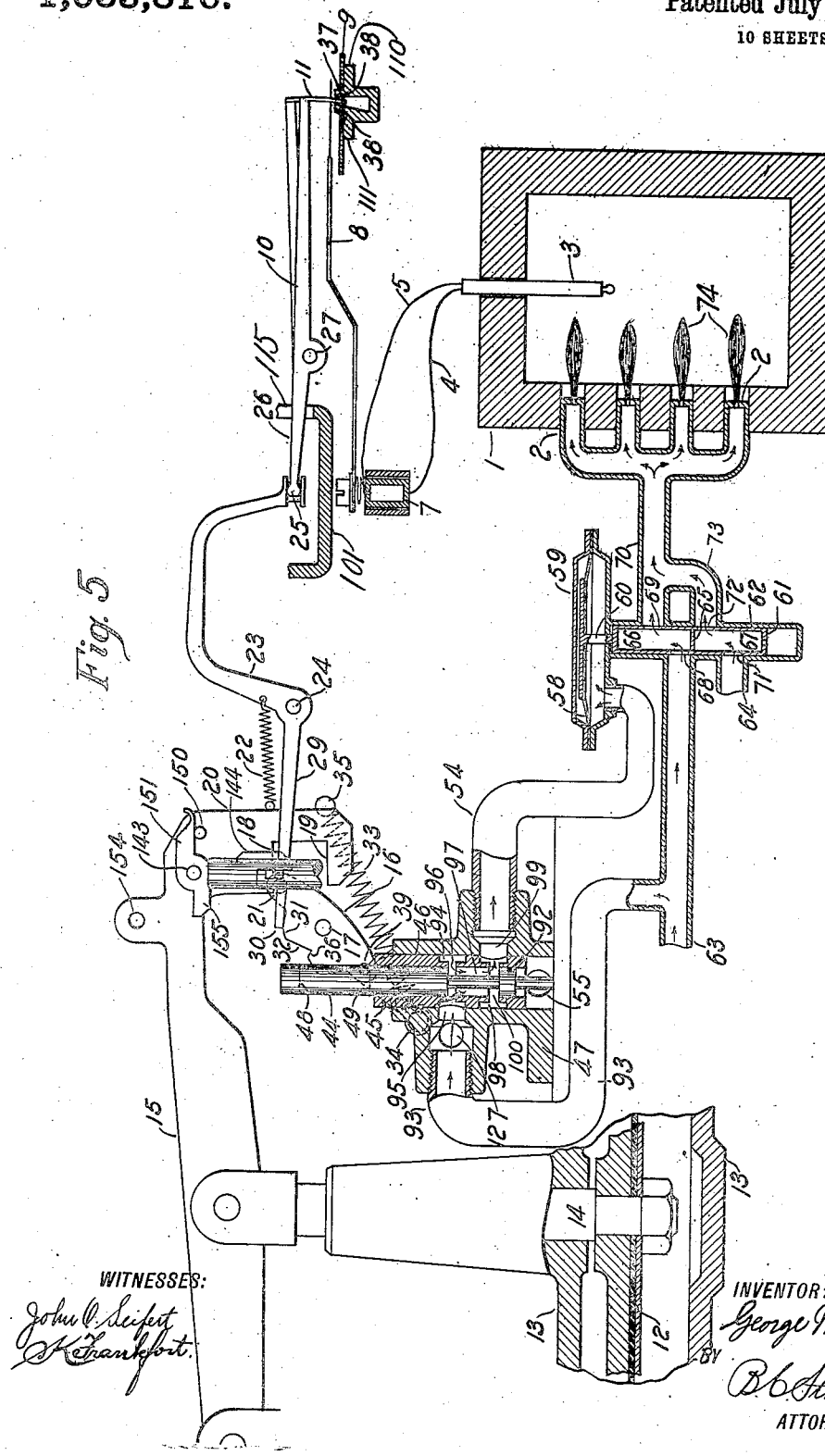

G. MACHLET, Jr.
HEATING APPARATUS.
APPLICATION FILED NOV. 23, 1908.
1,033,816.
Patented July 30, 1912.
10 SHEETS—SHEET 5.
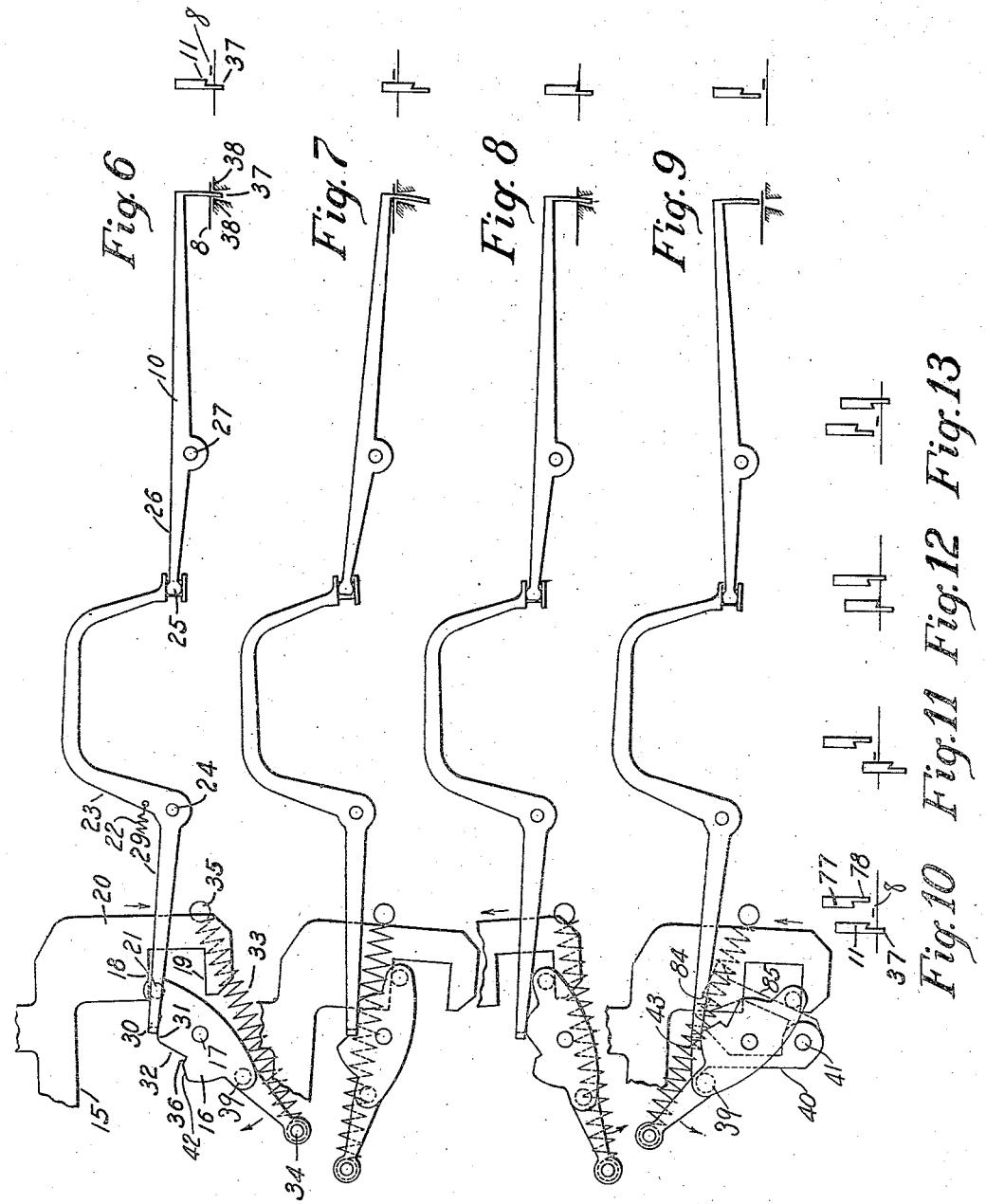
WITNESSES:
John O. Seifert
K. Frankfort
INVENTOR
George Machlet Jr
BY
D. C. Stickney
ATTORNEY

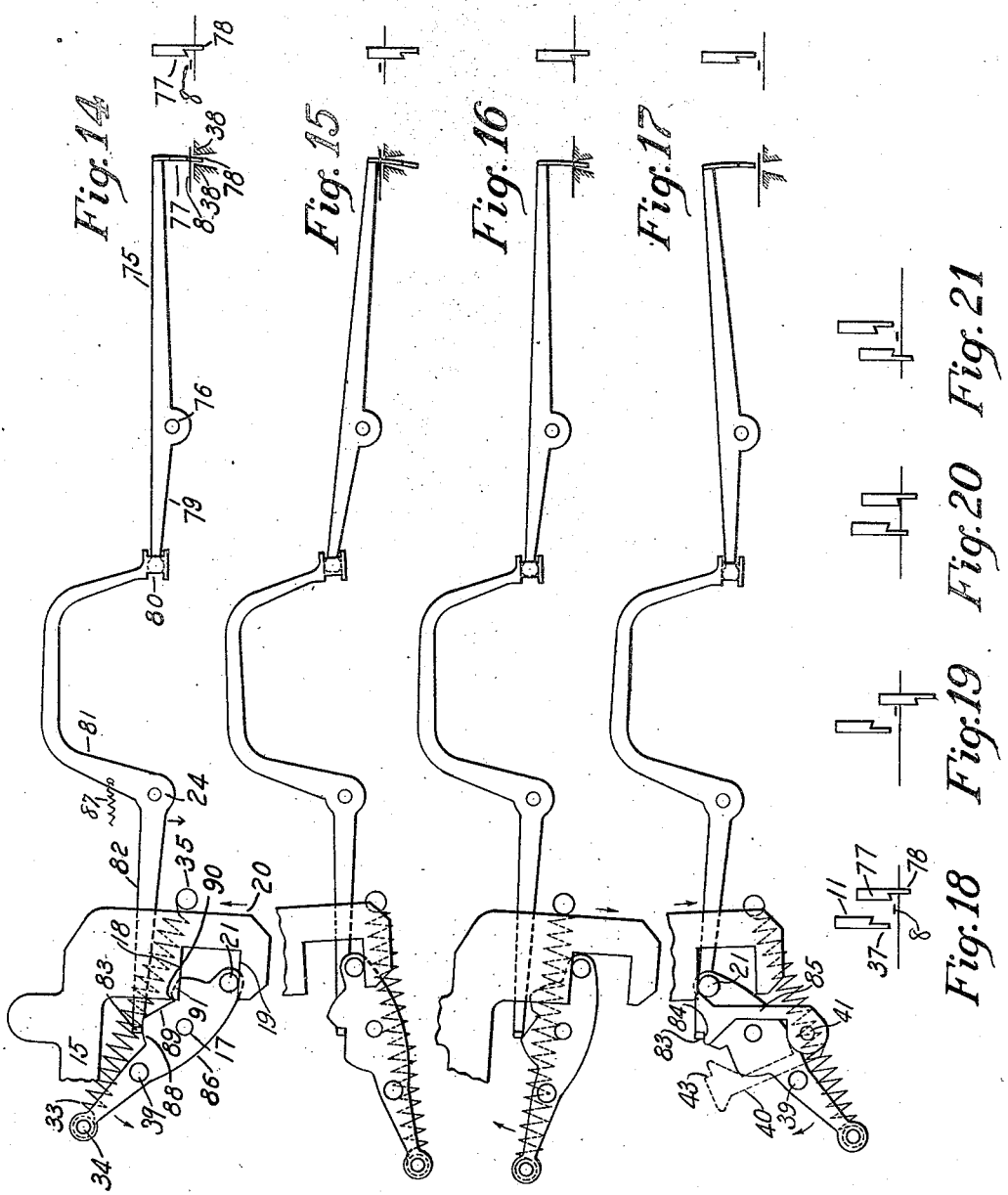

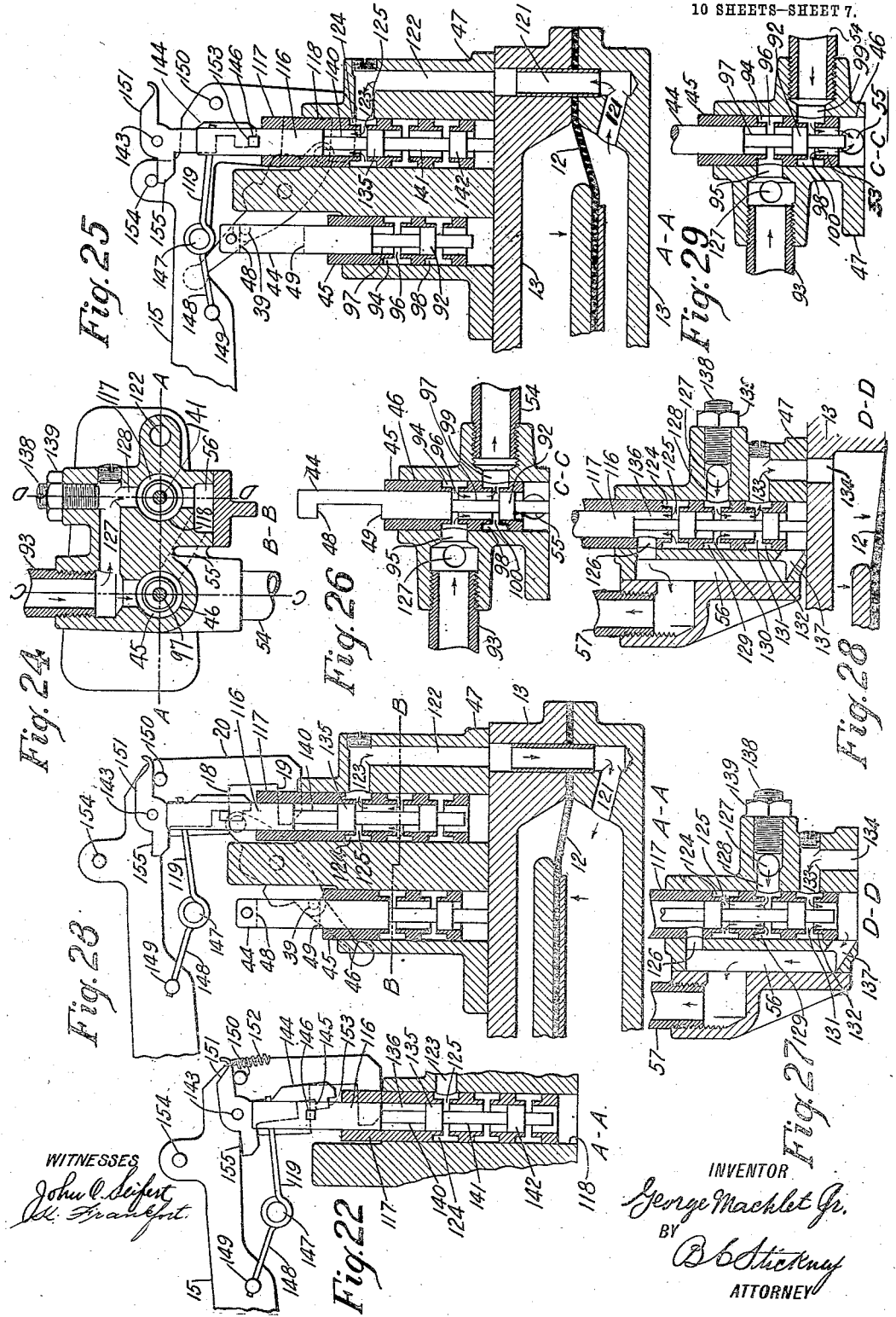

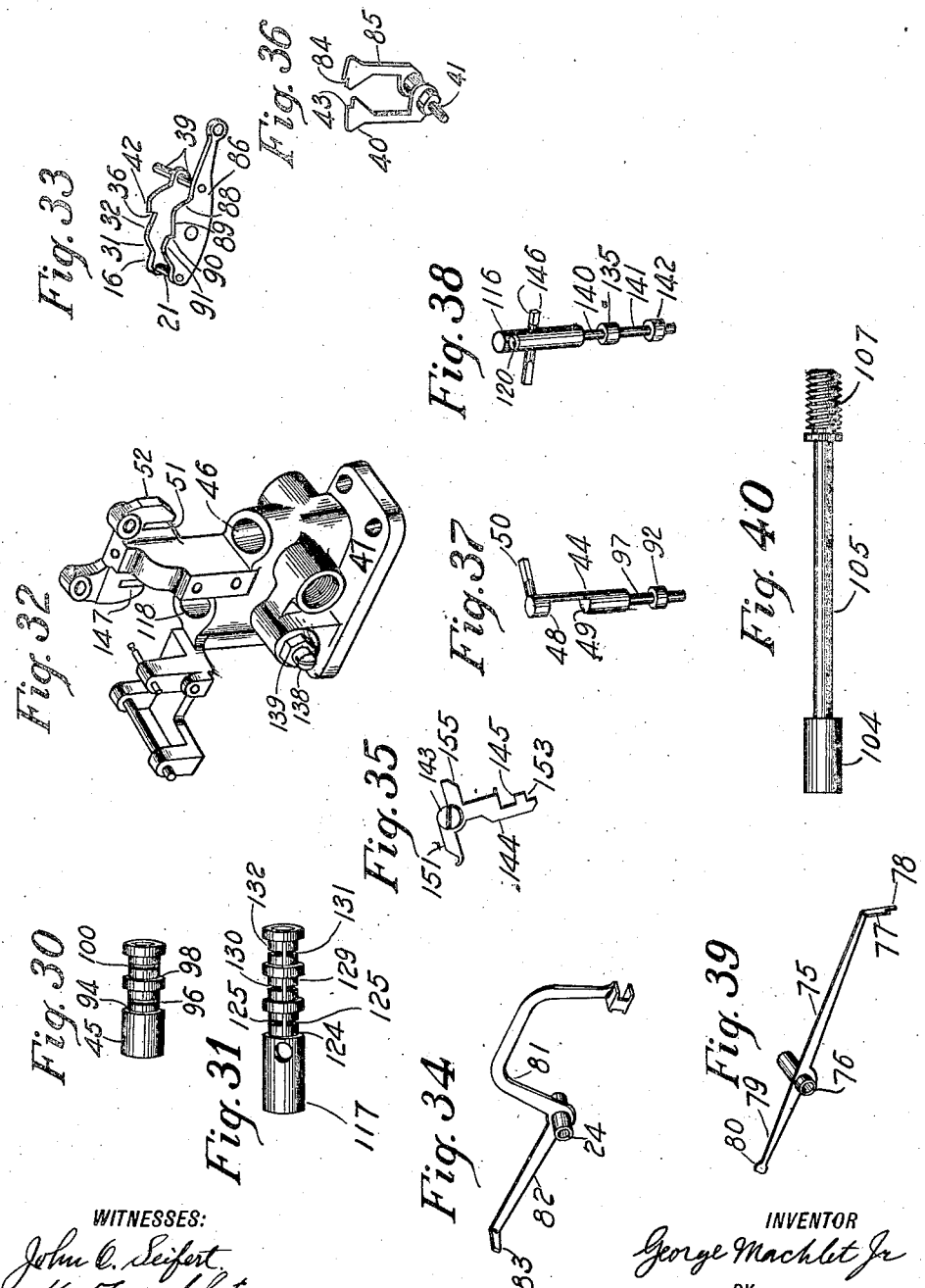

G. MACHLET, Jr.
HEATING APPARATUS.
APPLICATION FILED NOV. 23, 1908.

1,033,816.

Patented July 30, 1912.
10 SHEETS—SHEET 9.

WITNESSES:
John C. Seifert
K. Frankfort

INVENTOR
George Machlet Jr
BY
R C Stickney
ATTORNEY

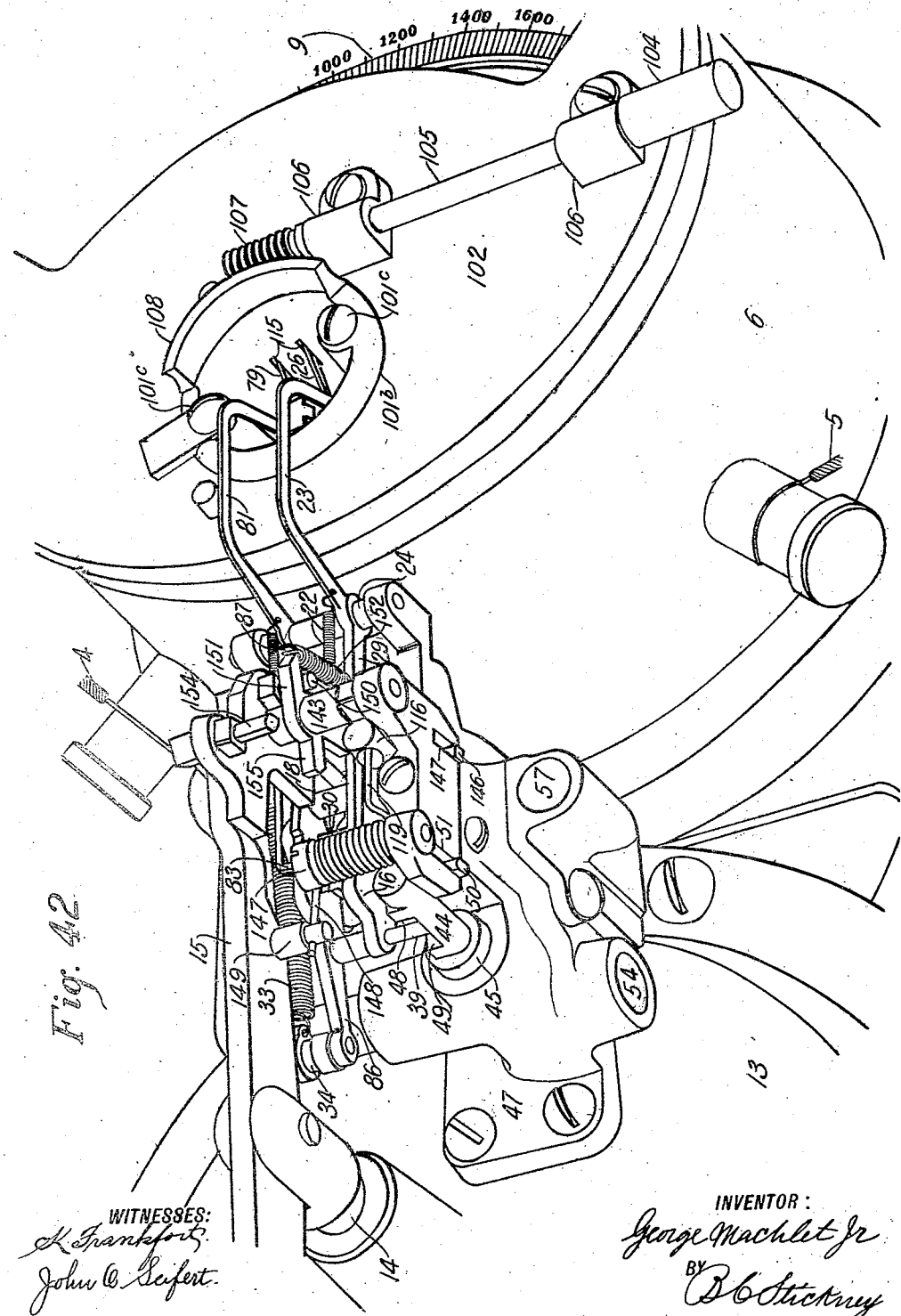

UNITED STATES PATENT OFFICE.

GEORGE MACHLET, JR., OF ELIZABETH, NEW JERSEY.

HEATING APPARATUS.

1,033,816.　　　Specification of Letters Patent.　　Patented July 30, 1912.

Application filed November 23, 1908. Serial No. 464,140.

*To all whom it may concern:*

Be it known that I, GEORGE MACHLET, Jr., a citizen of the United States, residing in Elizabeth, in the county of Union and State of New Jersey, have invented certain new and useful Improvements in Heating Apparatus, of which the following is a specification.

This invention relates generally to automatic regulators and controllers or analogous contrivances, and especially to those in which there is employed any movable device, as for instance a needle, to indicate the condition of an apparatus which is to be regulated, stopped or started, or otherwise controlled.

The invention is illustrated in connection with a gas and air furnace, although so far as many of its broad features are concerned, its use is not limited to furnaces or even to heat-controlling means, as they are capable of wide application in various arts.

In many classes of indicating devices, as for instance voltmeters, and certain kinds of gages, the condition of the apparatus is indicated by a delicate needle, which, owing to its weak construction and action, cannot be employed to operate means for regulating the apparatus whose condition is shown by the indicator, particularly since it is difficult or impossible to cause such a weakly acting indicator to perform any work, even if it could be done without destroying its accuracy.

The principal object of the present invention is to produce a practicable regulator or other controller, whose operation may be accurately controlled by indicators of this class, even though they are extremely delicate in construction and weak in operation; and particularly to provide for the regulation of a furnace or any other heating or cooling apparatus.

A further object of the invention is to provide for causing a change in the condition of an apparatus, as for instance in the heat of a furnace, to proceed a predetermined point, and for the automatic maintenance of such condition at such point for an indefinite time. There is accordingly provided a prime mover, as for instance a reciprocating engine driven by compressed air, capable of shifting a regulating device or controller to alternate positions, whereby the condition of the furnace or any other apparatus may be regulated, or any mechanism may be stopped or started, etc. The movable needle of the voltmeter or other indicating apparatus is provided with means to control the actuation of said regulating device by said prime mover. This is accomplished without exertion or effort on the part of the needle beyond what is required to bring it to the point at which the regulation is to take place.

The operative connection between the needle and the prime mover is effected by means of a tactor or similar device, which is caused by the prime mover to beat repeatedly into and out of the path of the needle. While the needle is moving toward the tactor, no change is effected; but when the needle moves into the path of the tactor, the tactor is of course arrested by engagement with the needle (the latter being provided with a suitable support); and by reason of this arrest a shifting of the regulating or controlling device to an alternative position is effected. Thus no stress is put upon the needle, nor is anything done to render the latter liable to act inaccurately; while on the other hand the movement of the regulating device is positively effected by powerful means. Upon being arrested by the needle, said tactor is automatically latched out of use, and a companion tactor is caused to dip repeatedly into the path of the needle, but on the opposite side thereof, so that when the needle recedes it will soon get into the path of the second tactor and arrest it; whereby an opposite movement of the regulating device to an alternative position is effected, and whereby also the second tactor is latched out of use and the first tactor again rendered active. The apparatus may be set to cause these operations to occur at any desired point in the path of the needle, so that in starting up a furnace or other apparatus, it is only necessary to adjust the tactors to a point at which it is desired to maintain the heat of the furnace, whereupon the furnace will become heated sufficiently to carry the needle into the field of the tactors, and the heat will then be automatically maintained at such point, by the coöperation of the needle with the tactors in alternation.

Between the tactors and the prime mover is an interponent, through which movement is communicated from the prime mover to the active tactor and by which alternative movements of a regulating valve or other controlling mechanism are produced. In the present instance this interponent is in the form of a pivoted tumbler, and it is provided with a double-acting spring. The prime mover operates to swing the tumbler sufficiently to carry the spring over the dead center, and the spring then becomes effective to complete the stroke of the tumbler, whereby the regulating valve or controller is shifted to its alternative position.

The tactors are provided with individual springs, and connected to sears. The active sear is normally caused by each spring to bear against a rest provided upon the tumbler. As the latter begins to move away from normal position, the sear is permitted to swing into a notch formed on the tumbler, thereby accomplishing a two-fold purpose, one of which is to permit the associated tactor to dip into the path of the voltmeter needle, and the other of which is to enable the sear to arrest the tumbler prematurely, so that movement of the latter cannot be completed by the double-acting spring, and so that no movement can be effected of the regulating valve or other controller. When, however, the tactor is arrested by the voltmeter needle, there is nothing to prevent the completion of the full stroke of the tumbler and consequently the reversal of the regulating valve. The tumbler at the final part of its full stroke also latches out of use the arrested tactor, and effects the release of the other tactor.

Other features and advantages will hereinafter appear.

In the accompanying drawings, Figure 1 is a diagrammatic side elevation showing a prime-moving arm as having completed its up-stroke, and a pair of tactors, of which the rear or idle one is latched out of use, and the front or active one has just been lifted. Fig. 2 is a part-sectional side elevation of one form of regulating mechanism constructed within the present invention. Fig. 3 is a plan of the device seen at Fig. 2. Fig. 4 is a sectional diagrammatic elevation to illustrate the operation of reducing the supply of fuel to a furnace when its heat reaches a predetermined point. Fig. 5 is a view similar to Fig. 4 but illustrating the operation of increasing the supply of fuel to a furnace when its heat has declined to a predetermined point. Figs. 6 to 9 inclusive illustrate a succession of stages in the operation of the tactor device which controls the reduction in the fuel supply. Figs. 10 to 13 are diagrammatic end elevations showing the relation of the voltmeter needle to the tactors at the four stages represented in Figs. 6 to 9. Figs. 14 to 17 inclusive illustrate a succession of stages in the operation of the tactor device which controls the increase in the fuel supply. Figs. 18 to 21 are diagrammatic end elevations showing the relation of the voltmeter needle to the tactors at the four stages represented in Figs. 14 to 17. Fig. 22 is a fragmentary sectional elevation taken at the line A—A of Fig. 24, and illustrating the valve mechanism which controls the movements of the prime-moving compressed-air motor or engine; the arm or beam of the latter being shown at the completion of its up-stroke. Fig. 23 is a sectional elevation showing the engine arm nearly at the completion of its up stroke, and showing the regulating valve as having been moved down to the Fig. 5 position to increase the supply of fuel to the furnace. Fig. 24 is a sectional plan taken on the line B—B of Fig. 23. Fig. 25 is a sectional elevation similar to Fig. 23, but showing the air motor arm nearly at the bottom of its down stroke, and also showing the fuel-controlling valve as lifted to the Fig. 4 position to reduce the supply of fuel in the furnace. Fig. 26 is a sectional elevation taken on the line C—C of Fig. 24 and showing the fuel-controlling valve in the Fig. 5 position. Fig. 27 is a fragmentary sectional elevation taken on the line D—D of Fig. 24, showing the parts in the Fig. 22 position. Fig. 28 is a section similar to Fig. 27, but showing the parts at the completion of the down stroke of the air motor arm. Fig. 29 is a sectional elevation of the line C—C of Fig. 24, and showing the fuel controlling valve in the Fig. 4 position to reduce the supply of fuel to the furnace. Fig. 30 is a perspective view of a shell or hollow cylinder cut away to form chambers and ports to be opened and closed by the fuel-controlling valve which works in said shell, the latter fitting into a bore formed in the main casting or chest. Fig. 31 is a similar view of a shell to receive the controlling valve of the prime-moving air motor or engine. Fig. 32 is a perspective view of the valve chest. Fig. 33 is a perspective view of a duplex tumbler which forms an interponent between the tactors and the prime-moving air motor. Fig. 34 is a perspective view of a sear. Fig. 35 is a perspective view of a latch to detain the valve of the air motor. Fig. 36 is a perspective view of a double latch for the tactors and their sears. Fig. 37 is a perspective view of the pilot valve that controls the supply of fuel to the furnace. Fig. 38 is a perspective view of the valve of the air motor. Fig. 39 is a perspective view of a tactor to connect with the sear seen at Fig. 34. Fig. 40 is a worm whereby the tactors may be adjusted to act at any desired point along the path of the voltmeter needle. Figs. 41 and 42 are perspective views of a voltmeter and tactor mechanism.

In a furnace 1, provided with burners 2 for mixed air and gas, is inserted an element 3, from which lead wires 4, 5 to a voltmeter or other galvanometer 6, said wires connected to a pivoted rotating coil 7, to which is attached, in the ordinary manner, a needle or indicator 8, which moves along a scale 9 to show the condition of the furnace. A lever 10 is caused by a prime mover to vibrate up and down, to cause a tooth or projection 11 on its free end to dip into and out of the path of the moving needle 8, and is intended to coöperate with said needle at the proper time to reduce or cut off the supply of fuel to the furnace. The tooth 11 is intended to be intercepted by the needle, whereby the lever 10 is arrested, and the desired regulation of the furnace effected. It will be seen from the ensuing description that a mere touch of the lever 10 upon the needle is sufficient; and for convenience the lever or its tooth is termed a "tactor".

The tactor may be made in a variety of forms and need not necessarily be reciprocatory; and it may be operated repeatedly by any kind of a prime mover. As an illustration, there is shown herein a prime mover in the form of a compressed-air engine, comprising a diaphragm 12 inclosed in a casing 13 and connected by a rod 14 to a beam 15. The means by which the diaphragm 12 is caused to rise and fall repeatedly will be hereinafter explained.
The prime moving beam or arm 15 is connected to the tactor 10 to reciprocate the latter, through an interponent. This comprises a rocker or tumbler 16, pivoted at 17 upon the framework. Said interponent is reciprocated by means of upper and lower lugs or shoulders 18, 19 provided upon an elbow 20 of said prime moving arm 15; said lugs adapted to engage a wrist 21 provided upon said interponent.
A spring 22 tends constantly to drop the tactor 10 into the path of the needle; but such movement is controlled by the tumbler 16. The spring, it will be seen, is attached to an arm 23, the latter pivoted at 24 on the frame work, the outer end of the latter being connected by a universal joint 25 with an arm 26 of the tactor 10. Said tactor is itself pivoted between its ends at 27 upon a support 28 in the voltmeter box 6. Fixed to the arm 23 is an arm 29, having at its end a finger 30, which, at Figs. 5 and 6, is pressed by said spring against a stop or rest 31 formed upon the tumbler 16, whereby the tactor or tooth 11 is held up out of the path of the needle. As the tumbler is turned by the prime mover from initial position in the direction shown by the arrow at Fig. 6, the lever 29 rides down an inclined edge 32 formed on one side of a notch in the tumbler, and reaches the position seen at Fig. 7; the tactor 10 having, during this movement, dipped idly into the path of the needle.

A double-acting draw-spring 33, connected at one end to a pin 34 upon the interponent, and at the other end to a fixed stud 35, resists the initial movement of the interponent from the Fig. 6 position, but after passing the dead center tends to swing the interponent to the other extreme of its movement (Fig. 9). Thus the prime moving arm 15 coöperates with the spring to effect movement of the interponent; the prime moving arm starting the interponent from initial position until the spring is enabled to act upon the interponent to swing it farther in the same direction independently of the prime mover. Said spring 33, however, is permitted to swing the interponent only to the position seen at Fig. 7, because the finger 30 of arm or sear 29 engages an abrupt edge or stop 36 which forms the other side of the notch in the tumbler, and so prevents the spring 33 from effecting further movement of said tumbler or interponent. Things remain in this condition until the prime mover 15 begins its up stroke, whereupon its lug 19 engages and lifts the wrist 21 and turns the interponent in opposite direction until the spring 33 has again crossed the dead point, whereupon the spring completes the movement of the interponent back to the initial Fig. 6 position. During this return of the interponent, the inclined edge 32 cams up the lever arm 29, and lifts the tactor tooth 11 out of the path of the needle. The described movements are repeated idly while the furnace is heating up and the needle 8 is consequently swinging from its normal or zero position toward the tactor 10. Finally the advancing needle 8 swings directly beneath the tactor 11 (accidental movement of the needle past said tactor being prevented by a guard 37 pendent from the tactor), and the tactor is consequently arrested at the beginning of its downward movement, as seen at Fig. 8. The tactor-moving spring 22 is so weak that the tactor exerts hardly any appreciable pressure upon the needle. The latter is provided with opposite supports 38, between which the tactor tooth dips; said supports being so close together that a very thin and weak needle resting thereon is enabled to withstand the light pressure of the tactor without liability of injury, and without possibility of the tactor forcing its way down past the needle, or crowding the needle aside; so that the tactor is positively arrested. The supports 38 are segmental in form, curving around the axis of movement of the needle, to permit the tactor to operate at any desired point along the path of the needle, as will presently be explained. Because of such arrest, the downward beat of the tactor is interrupted, and hence the connected sear 29 is prevented from falling into the notch 32, 36 in the tumbler 16; and in consequence, when the tumbler or interponent has turned sufficiently to carry the spring 33 past the dead point, said spring immediately snaps the interponent up to its extreme opposite position, as seen at Fig. 9, without interference from the sear 29. During the final portion of the swing of the interponent to the Fig. 9 position, a pin 39 thereon strikes a latch 40 (pivoted at 41 upon the framework) and moves it to the right to a position to catch the finger 30 of the sear 29, whereby the sear and its connected tactor 10 are latched out of use. A cam 42, formed on the tumbler next to the stop 36, serves to lift the sear 29 high enough to slip into the notch 43 of the latch; this movement of the sear being also sufficient to lift the tactor 10 sufficiently to bring its needle guard 37 clear of the needle 8, as shown at Fig. 9; and if there should be a further temporary increase in the heat of the furnace, it will be accurately shown by the needle, while injury to the needle or coil is avoided. The tactor and sear being now latched, remain stationary during the continued operation of the prime mover and the interponent, the movements of these two elements not being interrupted by reason of the arrest of the tactor by the needle. Said interponent also performs the function of controlling a valve 44, which slides up and down in a cylindrical shell 45, the latter formed with suitable ports and channels, and fitted tightly within a vertical bore 46 extending down into the top of a chest 47 erected upon the diaphragm casing 13.

The pin 39 of the interponent is prolonged to play between upper and lower shoulders 48, 49 formed on said valve 44; and during the described final upward movement of the interponent to the positions shown at Figs. 4 and 9, the pin 39 engages the shoulder 48 and lifts the valve, which may be provided with a lateral guide-pin 50 to work in a guide-slot 51 formed in a fixed vertical plate or bracket 52. The lifting of the valve or rod 44 opens a port 53 formed in the shell 45 and permits air to escape from the pipe 54 through said port, and through an exhaust passage 55 leading horizontally in the bottom of the chest 47 from the bore 46 to a vertical exhaust chamber 56, formed in said chest and having an exhaust pipe 57. By this means air is exhausted from beneath a diaphragm 58 provided in a casing or head 59; said pipe 54 leading to the lower chamber in said casing. The diaphragm 58 is connected by a stem 60 to a vertical hollow cylindrical valve 61, movable up and down in a fixed shell 62, and controlling the feed of compressed air from a supply pipe 63, and of gas through a supply pipe 64, to the burners 2 in the furnace 1. The valve 61 is divided by a midway partition 65 into upper and lower chambers 66, 67. The upper chamber 66 is provided with an inlet port 68, opening from the air supply pipe 63, and an outlet port 69, opening into a pipe 70 leading to the furnace. The lower valve chamber 67 is provided with similar ports 71, 72, in communication respectively with the gas supply 64 and an elbow or branch 73, which opens into the pipe 70. These ports are placed so as to secure proper proportions of air and gas during all fluctuations in the volume of the mixture fed into the burners. It will be seen that the dropping of the valve 61, caused by the movement of the pilot or primary valve member 44, to its Fig. 4 position, nearly cuts off the supply of gas and air from the burners, and hence the flames 74 are reduced, thus preventing the heat of the furnace from increasing appreciably, if any, beyond the point at which it stood at the moment when the tactor 10 was arrested by the voltmeter needle 8.

It will be understood from the foregoing, that upon lighting the furnace and starting the prime mover, the heat of the furnace will increase to a predetermined point, and that then the supply of fuel will then be reduced automatically. The prime mover however, continues to reciprocate just the same as before the fuel supply was reduced; and means are further provided to coöperate with said prime mover and with the voltmeter needle 8, to renew the supply of fuel at the proper time, to prevent the heat of the furnace from declining below the desired point. This is effected by means of a substantially similar train of tactor, sear and tumbler devices to that already described. The tactor referred to, which is designated as 75, extends alongside of the tactor 10, and is mounted on the same pivot 76, and has a tooth 77 provided with a pendent needle-guard 78. An arm 79 of the tactor is connected by a universal joint at 80 with an arm 81 fixed to a sear 82, mounted upon the same pivot 24 as the sear 29, and extending alongside of the same and having at its end a finger 83 similar to 30; the parts of the tactor and sear devices being however, preferably opposite to those in the other set, as shown.

During the described movements of the first tactor 10, the second tactor 75 has been held motionless and idle above the needle, as at Fig. 17; the finger 83 of the sear being caught in a notch 84 provided upon a latch 85. This latch 85 is fixed to the latch 40, as seen clearly at Fig. 36; and it will be understood that when 40 was caused by the interponent to swing over to catch the sear 29, as at Fig. 9, the latch 85 was simultaneously swung away to release the sear 82 and tactor 75, and permit them to become active under the influence of the prime mover 15. The interponent referred to is of a duplex character, comprising both the tumbler 16 and a companion tumbler 86 fixed thereto, and of opposite construction, to coöperate with the sear 82 and tactor 75 in the manner already described with reference to the tumbler 16, sear 29 and tactor 10. A like spring 87 similar to 22 tends to cause the tactor 75 to beat into the path of the needle, and causes the sear 82 to rest upon a stop 88 on the tumbler 86. It will thus be seen that two trains of mechanism ramify from the prime mover to the needle, and that either set may be rendered effective and the other simultaneously ineffective. At the next upward stroke of the prime mover 15 following the latching up of the tactor 10 and the releasing of the tactor 75, the shoulder 19 on said prime mover engages the wrist 21, and lifts it to turn the tumbler 86, while the sear 82 rides down an incline 89 corresponding to the incline 32 on the other member of the duplex tumbler, and permits the tactor 75 to beat down into the path of the needle. The prime mover continues to lift the pin 21 until the double-acting spring 33 passes the dead center, whereupon the spring causes the movement of the tumbler to continue until it is prematurely arrested, Fig. 15, by the engagement of the sear 82 (or of its finger 83) with a stop 90 corresponding with 36. At this moment, tooth 77 of the tactor 75 is down past the needle and between the supports 38. At the next downward movement of the prime mover 15, the shoulder 18 depresses the wrist 21 sufficiently to carry the spring 33 up past the dead point, whereupon the spring snaps the interponent up to the Fig. 14 position. This beating action continues, the tumbler 16 vibrating idly in unison with the effective tumbler 86, while the tactor 10 remains latched up out of use, and until the needle 8, which is now making a retrograde movement because of the reduction in the heat of the furnace (due to the reduction of the fuel supply thereto), intercepts tooth 77 of tactor 75; whereupon said tactor is arrested, together with the sear 82, in the Fig. 16 position, and said sear is prevented from causing the interponent to stop at the Fig. 15 point, and hence said interponent is driven by the spring 33 around to the Fig. 17 position. A cam 91 on tumbler 86 lifts the sear 82, and pin 21 swings latch 85 over to catch the finger 83 of said sear, whereby the latter is latched out of use and its connected tactor 75 is elevated above the needle, as at Fig. 17. At the same time, the pin 39 on the double tumbler or interponent engages the bottom shoulder 49 on the valve member 44, Fig. 5, and depresses said member to carry the valve proper 92 down, to close the passage between the diaphragm pipe 54 and the exhaust 55, and to open a passage from a branch 93 of the compressed air supply pipe 63, so that air may flow from said branch 93 through the chamber shell 46 into the pipe 54 and thence to the diaphragm head 59, to lift the diaphragm and the valve 61 to the Fig. 5 position, thus opening wide the ports and permitting a full supply of mixed gas and air to pass to the burners, whereby the flames 74 are increased to normal size, and the furnace is preventing from cooling further, and begins to heat up again.

The described movement of the latch 85 to the Fig. 17 position to lock tactor 75 out of use, was accompanied by a movement of the latch 40 to release the sear 29 and tactor 10, said tactor and sear again becoming active and operating in the manner already described. The needle of the voltmeter thus moves from zero position up to the field of the duplex tactor mechanism, and then has slight oscillation in said field back and forth from one tactor to the other, whereby the heat of the furnace is maintained within exceedingly close limits, and in practice is found to keep within two or three degrees of the desired point, even at high heats required for hardening steel or otherwise heat-treating metals and other materials. This close regulation is of great importance in many cases, especially where it is desired to heat the articles precisely and uniformly for a considerable length of time. There is practically no waste of fuel, so that a great saving is effected in the cost of operation; while the life of the element 3 is greatly prolonged, since it is never subjected to excessive heat.

It will be seen that by this device even the thin needle or indicator of any instrument may be used without liability of damage to itself and without requiring it to put forth any power to operate the regulator, as it is simply required to move into proper position by its own impulse, to form an interceptor, to enable the regulating device to start or suspend the operation of a machine.

The invention is especially valuable in cases where it is necessary to make the indicator of frail construction, and in which the power which moves the indicator is very weak, while at the same time great accuracy of action is demanded. The indicator is used only as a temporary inert support or fulcrum for the tactor, or as an interponent between the tactor and the fixed support 38, and is not called upon to exert any force beyond that required to move itself into position between the two devices 11 and 38, whereby may be accomplished a shifting of any desired mechanism to an alternative position, so that a great variety of results may be accomplished besides reducing or increasing the supply of mixed air and gas to a furnace. The needle may be regarded as forming an impediment to the movement of the spring-actuated tactor, whereby the latter is prevented from causing the arrest of the tumbler, with the results above set forth.

It will be observed at Figs. 5, 26 and 30, that the shell 45 is peripherally grooved or recessed at 94, to coöperate with the wall of the bore 46 to form an annular chamber which registers with an orifice 95 in the chest 47, through which the compressed air is admitted from the pipe 93; and that the grooved wall of the shell is perforated at 96 on opposite sides, to permit the flow of air from the chamber 94 into the interior of the shell 45, as indicated by the arrows at Fig. 5; the rod on which the valve is formed being reduced at this point to form a stem 97 connecting the valve proper 92 with the main valve-rod 44. At Fig. 5, the valve 92 closes the lower portion of the shell 45 to shut off the passage to the exhaust. It will also be seen that the shell 45 is formed with a peripheral recess 98 in its lower portion, to coöperate with the wall of the bore 46 to form an annular passage in register with the port 99 in the chest, into which opens the pipe 54 which leads from the chest to the diaphragm casing 59. The wall of the shell is likewise oppositely perforated at 100 to permit the air entering the shell from the supply pipe 93 to pass out from the shell into the chamber 98 and thence into the pipe 54, to lift the diaphragm 58, together with the mixture-controlling valve 61. When the valve rod 44 is raised, as at Figs. 4 and 29, valve 92 closes the shell 45 between the annular passages 94 and 98, thus cutting off communication between 93 and 54. At the same time the lower end of the chamber is opened to permit air to pass from the pipe 54 out through the exhaust passage 55, whereby the diaphragm 58 is permitted to drop with the valve 61, and the supply of mixed gas and air is reduced.

The support 28 for the tactor levers is in the form of a lug cast upon a hollow or cup-like support 101 sunken below the cover 102 of the voltmeter box, and consisting of two parts 101ª and 101ᵇ, formed to catch over the top and bottom edges of a circular hole 103 formed in said cover, said part 101ᵇ fitting in said hole, and the latter being concentric to the rotative axis of the needle 8. Said parts 101ª and 101ᵇ are rigidly joined by screws 101ᶜ to form a hollow bushing, or a swiveled supporting head for the tactor levers. The universal joints of said levers with the sear levers are in the bottom of the cup, in proximity to the axis of movement of the swiveled head, so that the head may be swung in either direction without disturbing the connection between the tactor levers and the sear levers. The arms 23 and 81 of the sear levers are bowed, to carry them up out of the cup and down again to their pivot 24. Any desired adjustment of the tactor levers may be effected by turning a finger piece 104, provided upon the end of a horizontal shaft 105, journaled in bearings 106 on said cover, and having at its inner end a worm 107 in mesh with a segment of a worm wheel 108 formed upon the top cup member 101ᵇ. By turning said finger piece 104, the tactor levers may be adjusted to any desired point on the usual voltmeter scale 9, thus providing for any required heat of the furnace; and the needle will automatically move to said point, and the heat of the furnace will remain substantially at that point for an indefinite time.

It will be seen that the outer support 38 for the needle point extends along the inner edge of the scale 9, and also that it may be cast integral with the inner support 38, as at Fig. 2; and the casting may have an outer flange 110 to support the scale, and also an inner stiffening flange 111, from which an arm 112 may extend to a projecting support 113 on the inner side wall of the box. The cover 102 has a curved pane of glass 114 over the scale and tactor needle ends, and it will be seen is practically dust tight. The tactor lever arms 26, 79 extend through a small hole 115 in the wall of the lower member 101ª of the cup.

The movements of the diaphragm 12 of the air motor or engine are effected by the aid of a vertical valve member 116, sliding up and down in a shell 117, which is fitted tightly in a bore 118 in the chest 47. At the completion of the up stroke of the arm 15, a spring 119, connected to a wrist 120 on said valve member, pushes the valve down from the Fig. 22 position to the Fig. 25 position, permitting air to escape from below the diaphragm 12, and causing compressed air to enter above said diaphragm. The escaping air passes through a passage 121, 122 to a port 123 in the chest opposite a top peripheral groove 124 formed in the shell 117, and through apertures 125 into the upper part of the interior of the shell, from whence it escapes through a port 126 into the exhaust chamber 56 passing out through the exhaust pipe 57, Fig. 28. At the same time, compressed air enters from the pipe 93 through a branch inlet 127, Figs. 4, 24 and 28, and a port 128, and through an annular chamber formed by a middle peripheral groove 129 in the shell 117, and through perforations 130 into the interior of the shell, passing down to the same and out through perforations 131 into an annular chamber formed by cutting a lowermost peripheral groove 132 in said shell, and through a port 133 in registry with the last-mentioned annular chamber and down through a passage 134 to the top of the diaphragm 12, to depress the same together with the rod 14 and arm 15, to the Fig. 25 position, or to a still lower position, as will be presently explained.

When the arm 15 reaches its lowest position, the spring 119 snaps the valve member 116 up to the Fig. 22 position, so that the upper valve 135 thereon closes the upper chamber 136 in the shell 117, and also closes the exhaust port 126 to the passage 122 leading to the under side of the diaphragm 12; but air escapes from the top of the diaphragm 12 through the passage 134 and port 133, passing through the bottom annular chamber 132 and the perforations 131 and then down through the bottom of the shell 117, as shown by the arrows at Fig. 27, and through a passage 137 to the exhaust chamber 56. At the same time air enters from the branch supply passage 127 and port 128, as shown by the arrows at Fig. 27, and passes through the middle annular chamber 129 into the interior of the shell, and thence up and out through the top perforations 125 into the annular chamber 124, from whence it passes through the port 123, as seen at Fig. 23, and down through the passage 122, 121, as shown by the arrows, into the bottom part of the diaphragm chamber, to lift the diaphragm rod 14 and arm 15 to the Fig. 22 position.

The speed of operation of the air motor is regulated by a throttle screw 138, Figs. 24 and 28, having a securing nut 139. This screw may be turned in, to partly close the air supply passage 127 and the port 128 to any desired extent, so that the arm 15, and hence the tactors, may be caused to beat at any desired rate.

It will be seen that the valve rod 116 is reduced in diameter to form stems 140 and 141 between the upper and lower valves 135 and 142 thereon, said stems coöperating with the inner walls of the shell 117 to form annular passages for the described movements of air. The lower valve 142 cuts off communication between the port 133 and the port 128 and exhaust chamber 56 in alternation, while the upper valve 135 performs the same functions between the ports 123 and 128 and exhaust chamber 56, so that the diaphragm 12 is caused to move up and down in response to the movements of the valve to alternative positions.

Pivoted upon the framework at 143 is a latch 144, having a shoulder 145 to engage a lug 146 upon the valve member 116, to hold up said valve during the ascent of the arm 15 and consequent downward tensioning of the spring lever 119; the latter coiled around a fixed rod or fulcrum 147, and connected by an arm 148 to a swiveled pin 149 on the arm 15. Near the top of the stroke of the arm 15, Fig. 23, a pin 150 on the arm strikes a releasing arm 151 formed on the latch, and swings the same to the right to cause the shoulder 145 to release the lug 146 (Fig. 22) and permit the spring arm 119 to snap the valve 116 down. The latch 144 is provided with a spring 152, which causes a shoulder 153 upon the bottom of the latch to swing over the pin 146, Fig. 25, to lock the valve down. On the down stroke of the arm 15, a pin 154 on said arm engages a release arm 155 on the opposite side of the latch, to swing the latch to one side and release the pin 146 (which transfixes the valve 116 and is guided in a vertical slot 147ª in the plate 52, Fig. 2) and the spring 119 then snaps the valve up to the position at Figs. 22 and 23, whereupon the spring 152 swings the latch from the Fig. 22 position to the Fig. 23 position, to hold the valve up until the completion of the upward movement of the arm 15.

Variations may be resorted to within the scope of the invention, and portions of the improvements may be used without others.

Reference is hereby made to my co-pending applications No. 328,697, filed August 1, 1906; No. 432,341, filed May 12, 1908; and No. 412,829, filed January 27, 1908; certain features disclosed in this application being covered in certain of said applications; but the present application being limited to features not covered by any of said applications.

Having thus described my invention, I claim:

1. An electrically operating regulator comprising a voltmeter having a movable needle, a member caused to dip repeatedly into the path of said needle, and regulating means connected to said dipping member and rendered effective by the coöperation of said needle and said dipping member.

2. The combination with an apparatus to be regulated, and a member connected to the apparatus and moved thereby to indicate the condition of the apparatus, of a regulating mechanism including a part caused to beat into and out of the path of said indicator, and means connected to said beating part for enabling said indicator and said beating part to coöperate to effect the desired regulation.

3. The combination with an apparatus to be regulated, of a voltmeter or electrical device connected to said apparatus and having a needle or member movable to indicate the condition of the apparatus, and a regulating mechanism including a part caused to dip repeatedly into the path of said needle and means connected to said dipping part for enabling said needle to coöperate with said dipping part to effect the desired regulation.

4. The combination with a voltmeter or device including a movable needle, of a tactor, means for causing said tactor to beat into the path of the needle, and a regulating or controlling device connected to said tactor and called into action by reason of the contact of the tactor with the needle.

5. The combination with a voltmeter or device including a needle, of a tactor, a regulatable apparatus subject to variation which causes movement of said needle toward said tactor, a prime mover for causing said tactor to beat into the path of the needle, and means connected to said tactor and called into action by reason of the contact of the tactor with the needle to regulate or control said apparatus.

6. A heat-regulating apparatus comprising an element or device whereby the heat produces an electrical current, a voltmeter connected to said element and having a needle or member to be moved by the current, and a regulating mechanism including a part caused to dip repeatedly into the path of said needle and means for enabling said needle to coöperate with said dipping part to effect the desired heat regulation.

7. A heat-controlling apparatus comprising a voltmeter having a needle caused to move by a variation in the heat which is to be regulated, a tactor, means for causing said tactor to beat into the path of the needle, and a heat-regulating device called into action by reason of the arrest or contact of the tactor with the needle.

8. The combination with a voltmeter including a movable needle, of a tactor, a regulatable apparatus subject to variation which causes movement of said needle toward said tactor, means tending to dip said tactor into the path of said needle, a prime mover repeatedly moving said tactor out of said path and permitting it to fall back into said path, and a regulating mechanism whose action is arrested or prevented by said tactor as the latter dips into said path, but which is left free to act when said tactor is restrained by its engagement with said needle.

9. A regulating apparatus comprising a voltmeter having a movable needle, a regulating device, a prime mover capable of causing a full operation of said regulating device, and a tactor moved by said prime mover into the path of said needle and having means operative at such movement to render said prime mover ineffective to cause a full operation of said regulating device; whereby when the tactor is arrested by contact with said needle, a full operation of the regulating device is effected by said prime mover.

10. The combination with a voltmeter including a movable needle, of a tactor, a regulatable apparatus subject to variation which causes movement of said needle toward said tactor, a prime mover, a regulating device started into action repeatedly by said prime mover, means to enable said prime mover to cause said tactor to dip into the path of said needle at each movement of said regulating device, and means to enable the tactor at such dipping movement to check the action of said regulating device; the latter being unchecked and free to operate fully when said tactor is arrested by contact with said needle.

11. The combination with a voltmeter including a needle, of a tactor, a regulatable apparatus subject to variation which causes movement of said needle toward said tactor, a prime mover for causing said tactor to move repeatedly into the path of the needle, a regulator associated with said prime mover and tending repeatedly to regulate said apparatus, and means rendered effective at the movement of said tactor into the path of the needle to restrain said regulator; whereby when the tactor is arrested by contact with the needle such movement of the regulator occurs, and said apparatus is thereby regulated.

12. The combination with an apparatus to be regulated, and a member connected to the apparatus and moving to indicate the condition thereof, of a tactor device, a spring tending to move said tactor device into the path of said indicating member, a rest or stop against which said tactor device is pressed by said spring, means to withdraw said stop to permit the spring to move said tactor device into the path of said moving member, and a prime moving regulator member arrested by said tactor device at its movement into said path; said stop-withdrawing means operatively connected to said regulator.

13. The combination with an apparatus to be regulated, and a member connected to the apparatus and moving to indicate the condition thereof, of a tactor, a spring tending to move said tactor into the path of said indicating member, a rest or stop against which said tactor is pressed by said spring, means to withdraw said stop to permit the spring to move said tactor into the path of said moving member, and a regulator provided with actuating means but rendered ineffective by said movement of said tactor.

14. The combination with an apparatus to be regulated and a member connected to the apparatus and moving to indicate the condition thereof, of a tactor constantly tending to move into the path of said indicating member, a rest for said tactor, a prime moving reciprocating regulator connected to said rest to move the same to permit said tactor to move into the path of said moving member, and an abutment connected to said rest and engaged by said tactor at such movement to arrest the movement of said regulator and prevent effective operation of the latter.

15. The combination of a voltmeter having a movable needle, a rocker, a double-acting spring holding said rocker in one position, a regulating device, a prime mover controlling said regulating device and capable of moving said rocker to carry the spring past the dead point, and a tactor caused by said rocker to beat across or into the path of said needle, and having means operating at every beat to arrest said rocker and said prime mover, to prevent operation of said regulating device.

16. A regulating apparatus comprising a voltmeter having a movable needle, a regulator, a rocker to control said regulator, a double-acting spring holding said rocker in one position, a prime mover capable of moving said rocker to carry the spring past the dead point, a tactor, a spring tending to move said tactor into the path of said needle, means controlled by said rocker to permit the tactor to dip into the path of said needle at the initial actuation of the rocker by said prime mover, and means associated with said tactor and operative at such movement of the latter for arresting the rocker and thereby rendering the prime mover ineffective to cause a complete operation of said regulator.

17. A regulating apparatus comprising a device having a movable needle or indicating part, a tactor movable into the path of the needle, a tumbler, a prime moving arm or device to cause said tumbler to withdraw the tactor from the path of the needle, means including a spring to cause said tumbler to move said tactor into the path of the needle, means for enabling the last mentioned movement of the tactor to arrest said tumbler, and regulating means operable by the tumbler under the influence of said spring when said tactor is prevented by said needle from arresting the tumbler.

18. A regulating apparatus comprising a device having a movable needle or indicating part, a tactor movable into the path of the needle, a sear connected to said tactor, a tumbler engageable by said sear, a prime mover coöperating with a spring to effect a reciprocation of said tumbler, the latter having means to act upon said sear to cause the tactor to dip into the path of the needle, and being also arrestable by said sear at such movement of the tumbler, and regulating means operable by the tumbler under the influence of said spring when said sear is prevented from arresting said tumbler by reason of the engagement of the tactor with the needle.

19. A regulating apparatus comprising a device having a movable needle or indicating part, a tactor movable into the path of the needle, a spring-pressed sear connected to said tactor, a tumbler engageable by said sear and having a part forming a rest against which the sear is pressed, a prime-mover coöperating with a spring to effect reciprocation of said tumbler, the latter having a cam or notch into which the sear drops during the movement of the tumbler, whereby said tactor is caused to dip into the path of the needle, a wall of said notch forming a stop to enable the sear to arrest the tumbler, and regulating means operable by the tumbler under the influence of its spring when said sear is prevented from falling into said notch by reason of the engagement of the tactor with the needle.

20. The combination of a regulating member, a prime mover tending repeatedly to cause the effective operation of said regulating member, and a controlling device extending from said regulating member and including a tactor caused by said prime mover to dip repeatedly into the path of a movable indicating needle and at such movement to render said regulating member ineffective, whereby when said tactor is arrested by contact with said needle, the regulating member is permitted to become effective.

21. The combination with a voltmeter or device having a movable needle, of a tactor, means for moving said tactor repeatedly into and out of the path of the needle, a guard upon said tactor to prevent the needle from passing by the same, and a controlling or regulating device called into action by reason of the arrest of the tactor by said needle.

22. The combination with a voltmeter or device having a movable needle, of a support for the point of said needle, a tactor, means for moving said tactor repeatedly into and out of the path of the needle in proximity to said support, and a controlling device connected to said tactor and called into action by reason of the arrest of the tactor by said needle and its support.

23. The combination with a voltmeter or indicating device having a movable needle, of supports for the point of said needle, a tactor, means for moving said tactor repeatedly into and out of the path of the needle between said supports, and a controlling or regulating device connected to said tactor and called into action by reason of the arrest of the tactor by said needle and its supports.

24. The combination with a voltmeter or device including a movable needle, of a tactor, means for adjusting the tactor to different points along the path of movement of the needle, means for moving said tactor repeatedly into and out of the path of the needle, and a controlling device connected to the tactor and called into action by reason of the contact of the tactor with the needle.

25. The combination with a voltmeter or device having a movable needle, of a member caused by a prime mover to dip repeatedly into the path of said needle, and regulating means connected to said dipping member and rendered effective by the coöperation of said needle and said dipping member, means being provided for permitting adjustment to be effected manually between the dipping member and the needle, to cause the regulation to take place at different points in the movement of the needle, as required.

26. The combination with a movable indicator, of a part caused by a prime mover to beat into and out of the path of said indicator, and means connected to said beating part for enabling said indicator and said beating part to coöperate to effect the desired regulation; said beating part being adjustable along the path of the indicator, to determine the point in the movement of the indicator at which the regulation shall be effected.

27. The combination with an apparatus to be regulated, of a voltmeter or electrical device connected to said apparatus and having a pivoted needle movable about its pivot to indicate the condition of the apparatus, a regulating mechanism including a part caused to dip repeatedly in to the path of said needle, means for enabling said needle to coöperate with said dipping part to effect the desired regulation, and means to adjust said dipping part about the pivot of the needle.

28. The combination with a voltmeter including a movable needle, of a tactor adjustable along the path of the needle, means for causing said tactor to beat into the path of the needle, and a regulating or controlling device called into action by reason of the contact of the tactor with the needle; said tactor being connected to said regulating device by a loose connection to permit the tactor to be adjusted along the path of the needle.

29. The combination with a voltmeter including a needle, of a tactor, a regulatable apparatus subject to variation which causes movement of said needle toward said tactor, a prime mover for causing said tactor to beat into the path of the needle, means called into action by reason of the contact of the tactor with the needle to regulate or control said apparatus, and a rotatable finger-piece having means for effecting fine adjustment of the tactor along the path of the needle.

30. A heat-regulating apparatus comprising an element or device whereby the heat produces an electrical current, a voltmeter connected to said element and having a needle or member to be moved by the current, and a regulating mechanism including a part caused to dip repeatedly into the path of said needle and means for enabling said needle to coöperate with said dipping part at any desired point along the path of travel of the needle to effect the desired heat regulation.

31. The combination of a voltmeter having a movable needle, a regulating device, a prime mover capable of causing a full operation of said regulating device, and a tactor moved by said prime mover into the path of said needle and having means operative at such movement to render said prime mover ineffective to cause a full operation of said regulating device; a loose connection being provided between said tactor and said prime mover, and the tactor being mounted for adjustment along the path of the needle.

32. The combination of a voltmeter having a movable needle, a tactor swiveled for adjustment along the path of said needle, means loosely connected to said tactor adjacent to its swiveling point for causing said tactor to beat into the path of the needle, and a regulating device called into action by reason of the arrest of the tactor by the needle.

33. The combination with a voltmeter, of a device having a pivoted needle, a regulating device, a prime mover capable of causing a full operation of said regulating device, and a tactor swiveled for adjustment around the pivot of the needle, and connecting means from said tactor to said prime mover to cause the former to be moved into the path of said needle, and having means effective at such movement to render said prime mover ineffective to cause a full operation of said regulating device; said tactor being loosely joined to said connecting means adjacent to its swiveling point.

34. The combination with a pivoted indicating needle, of a tactor device comprising two parts loosely connected, the first of said parts swiveled adjacent to its point of connection to the other part, for adjustment along the path of the needle, a spring tending to move the said first part into the path of said needle, a rest or stop against which the second part of said tactor device is pressed by said spring, a regulating device, and a prime mover operating said regulating device and having means to withdraw said stop to permit the spring to move said second part into the path of said regulating device to arrest the same.

35. The combination with a pivoted needle or member, of a tactor comprising two levers loosely connected, the first of said lebers swiveled near their point of connection for adjustment along the path of the needle, a spring tending to move the first lever into the path of said indicating member, a rest or stop against which the second lever is pressed by said spring, means to withdraw said stop to permit the spring to move said first lever into the path of said needle, a regulating device arrested by said second lever at the movement of the first lever into the path of the needle; and a prime mover connected to said regulating device and said tactor.

36. A regulating apparatus comprising a device having a pivoted indicating needle, a tactor movable into the path of the needle and also swiveled for adjustment about the pivot of the needle, a tumbler, a prime-moving arm or device coöperating with a spring to reciprocate said tumbler, a connection extending from said tumbler and joining said tactor loosely adjacent to its swivel, to cause the tactor to both dip into the path of the needle and arrest said tumbler, and regulating means operable by said tumbler under the influence of said spring whenever said tactor is prevented by said needle from arresting the tumbler.

37. A regulating apparatus comprising a device having a pivoted needle or indicating part, a head rotatable about the axis of the needle pivot, a tactor lever pivoted upon said head to move into the path of the needle, a sear mounted upon the framework and loosely connected to said tactor at about the axis of said rotatable head, a tumbler engageable by said sear, prime moving means to effect a reciprocation of said tumbler, the latter having means to act upon said sear to cause the tactor to dip into the path of the needle, and being also arrestable by said sear at such movement of the tumbler, and regulating means operable by an excessive movement of the tumbler when said sear is prevented from arresting said tumbler by reason of the engagement of the tactor with the needle.

38. A regulating apparatus comprising a device having a pivoted needle, a rotatable head, a rotatable finger piece to adjust said head about the pivotal axis of said needle, a tactor lever pivoted upon said head and movable into the path of the needle, a spring-pressed sear connected by a universal joint to said tactor adjacent to the axis of said head, a tumbler engageable by said sear and having a part forming a rest against which the sear is pressed, prime-moving means to effect reciprocation of said tumbler, the latter having a cam or notch into which the sear drops during the movement of the tumbler, whereby said tactor is caused to dip into the path of the needle, a wall of said notch forming a stop to enable the sear to arrest the tumbler, and regulating means operable by a further movement of the tumbler when said sear is prevented from falling into said notch by reason of the engagement of the tactor with the needle.

39. The combination of a regulating member, a prime mover tending repeatedly to cause the effective operation of said regulating member, and a controlling device extending from said regulating member and including a tactor caused by said prime mover to dip repeatedly into the path of a movable indicating needle and at such movement to render said regulating member ineffective, whereby when said tactor is arrested by contact with said needle, the regulating member is permitted to become effective; said tactor adjustable to different points along the path of said needle and loosely connected to the remainder of said controlling device to permit such adjustment.

40. The combination of a voltmeter having a needle, a tactor lever extending to the end of said needle, a sear connected to said tactor, a tumbler having a rest portion against which said sear is normally pressed by a spring, a double-acting spring holding said tumbler in normal position, a prime mover for turning said tumbler to cause said spring to pass the dead point, said tumbler having a stop against which the sear drops to arrest the tumbler; whereby when the tactor is arrested by contact with said needle, said spring is enabled to produce a supplemental or excessive movement of the tumbler independently of said sear; and regulating means rendered effective by said tumbler at such supplemertal movement thereof.

41. The combination of a case inclosing a voltmeter having a pivoted needle, a cup-like head sunken in the top of said case and rotatable about the pivotal axis of the needle, a worm and worm-wheel to turn said head, said worm having a finger-piece, a tactor lever pivoted upon said head and extending in one direction from its pivot to the end of said needle and in the other direction from its pivot to the interior of said head, a sear pivoted upon an exterior support and extending into said head and there connected by a universal joint to said tactor, a tumbler having a rest portion against which said sear is normally pressed by a spring, a double acting spring holding said tumbler in normal position, a prime mover for turning said tumbler to cause said spring to pass the dead point, said tumbler having a stop against which the sear drops to arrest the tumbler, whereby when the tactor is arrested by contact with said needle, said spring is enabled to produce a supplemental or excessive movement of the tumbler independently of said sear, and regulating means rendered effective by said tumbler at such supplemental movement thereof.

42. The combination of a movable indicator, a member caused to dip repeatedly into the path of said indicator, and a valve whose movement is controlled by the coöperation of said dipping member and said indicator; said valve forming part of a device to regulate an apparatus whose condition is shown by said indicator.

43. The combination of a movable indicator, a member caused to beat into and out of the path of said indicator, a primary valve whose movement is controlled by the coöperation of said indicator and said beating part, and a secondary valve controlled by the primary valve and controlling the condition of an apparatus whose condition is shown by said indicator.

44. The combination with a heating apparatus, of a movable indicator to show the temperature of the apparatus, a prime mover to dip repeatedly into the path of said indicator, and a valve controlled by the coöperation of said dipping-part and said indicator and having means to control the supply of heat-producing means to said heating apparatus.

45. The combination with a heating apparatus, of a movable indicator to show the temperature of the apparatus, a prime mover to dip repeatedly into the path of said indicator, a valve controlled by the coöperation of said dipping part and said indicator, and a secondary valve operated by the first valve, for admitting fuel to the heating apparatus.

46. The combination with a movable indicator, of a tactor, a prime mover for causing said tactor to beat into the path of said indicator, a valve operable by said prime mover, means rendered effective only at the movement of said tactor into the path of said indicator to prevent the prime mover from operating the valve, and means controlled by said valve to regulate an apparatus whose condition is shown by said indicator.

47. The combination with a movable indicator, of a tactor, a valve, a prime mover tending repeatedly to operate said valve, a sear controlled by said tactor and effective at the movement of the latter into the path of said indicator, to prevent the operation of said valve, and means controlled by said valve to regulate an apparatus whose condition is shown by said indicator.

48. The combination with a furnace, of an element or device whereby the heat of the furnace produces an electrical current, a voltmeter connected to said element and having an indicator to be moved by the current, a tactor, a prime mover yieldingly connected to said tactor to cause the latter to dip repeatedly into the path of said indicator, a primary valve operable by said prime mover only when said tactor is arrested by said indicator, and a secondary valve controlled by the primary valve, and admitting fuel to the furnace; a sear being controlled by the tactor to prevent the movement of the primary valve when the tactor dips into the path of the indicator.

49. The combination with a movable indicator, of a tactor device, a rest or stop, a spring pressing said tactor device against said rest or stop, a prime mover having means to withdraw said stop to permit the spring to move the tactor device into the path of said indicator, a valve operable by said prime mover, said tactor device having a sear effective only at the movement of the tactor device into the path of said indicator, for preventing the operation of said valve by said prime mover, and means controlled by said valve for regulating the condition of an apparatus whose condition is shown by said indicator.

50. The combination with a movable indicator, of a tactor constantly tending to move into the path of said indicator, a rest for said tactor, a prime mover having means to move said rest aside to permit the tactor to dip into the path of said indicator, a valve operable by said prime mover, means controlled by said tactor to prevent operation of said valve when the tactor dips into the path of the indicator, and means controlled by said valve to regulate an apparatus whose condition is shown by said indicator.

51. The combination of an indicator, a tactor, a rocker or tumbler to cause movement of said tactor into the path of said indicator, a prime mover coöperating with a spring to reciprocate said tumbler, a valve operated by said tumbler, means controlled by said tactor when it dips into the path of said indicator, to prevent operation of the tumbler and valve by said spring, and means controlled by said valve to regulate an apparatus whose condition is shown by said tactor.

52. The combination with a movable indicator, of a tactor constantly tending to move into the path of said indicator, a tumbler having a rest for said tactor, a prime mover and a spring coöperating to operate said tumbler, to cause the tactor to dip into and out of the path of said indicator, a valve controlled by said tumbler, said tactor having a sear to arrest said tumbler and prevent operation of said valve when the tactor dips into the path of the indicator, said sear being ineffective when the tactor is arrested by said indicator, and means controlled by said valve to regulate an apparatus whose condition is shown by said indicator.

53. The combination of an indicator, a tactor movable into the path of the indicator, a tumbler, a prime mover to cause said tumbler to withdraw the tactor from the path of the indicator, means including a spring being provided to cause said tumbler to effect a movement of said tactor into the path of the indicator, means for enabling the last-mentioned movement of the tactor to arrest said tumbler and prevent its operation of said valve, and means for enabling said valve to regulate an apparatus whose condition is shown by said indicator.

54. A regulating apparatus comprising a device having a movable needle or indicating part, a tactor movable into the path of the needle, a spring-pressed sear connected to said tactor, a tumbler engageable by said sear and having a part forming a rest against which the sear rests, whereby the tactor is held out of the path of said needle, a prime-mover coöperating with a spring to effect reciprocation of said tumbler, the latter having an opening into which the sear drops, whereby said tactor is permitted to dip into the path of the needle, a stop to enable the sear to arrest the tumbler, a primary valve operable by the tumbler under the influence of its spring when said sear is prevented from falling into said opening by reason of the engagement of the tactor with the needle, and a secondary valve controlled by said primary valve and having means to regulate an apparatus whose condition is shown by said indicator.

55. The combination of a movable indicator, a regulatable apparatus whose condition is shown by said indicator, and means, including a tactor dipping repeatedly into the path of said indicator, and devices extending from said tactor to said apparatus, for coöperating with said indicator to maintain the efficiency of said apparatus at a predetermined point.

56. The combination of a movable indicator, a regulatable apparatus whose condition is shown by said indicator, and a prime moving tactor mechanism dipping repeatedly into the path of said indicator and having both means to coöperate with said indicator when the latter reaches a predetermined point in its forward movement, for changing the condition of said apparatus in one way, and also means to coöperate with said indicator when the latter reaches a predetermined point in its retrograde movement, for altering the condition of said apparatus in the opposite way.

57. The combination of a movable indicator element, a regulatable apparatus whose condition is shown by said indicator element, and a prime moving mechanism connected to a tactor element to cause the latter to dip repeatedly into the path of said indicator element; said tactor element having relatively adjustable parts; one of said indicator and tactor elements being of compound construction; and said prime moving mechanism including means rendered effective by the arrest of said tactor element by said indicator element when the latter reaches a predetermined point in its forward movement, both to change the condition of said apparatus in one way, and also to effect alteration in adjustment of the parts of said tactor element, to enable it to be arrested by said indicator at a predetermined point in the retrograde movement of the latter, and thereby to cause said prime moving mechanism to alter the condition of said apparatus in the opposite way.

58. The combination of a movable indicator, a pair of tactors, a prime moving mechanism for causing either tactor to beat into the path of the indicator while the other tactor remains idle, means effective at the arrest of the active tactor by said indicator, to render the arrested tactor idle and cause the other tactor to become active, and a controlling or regulating device reciprocable by said prime moving mechanism and under the control of the active tactor.

59. The combination with a voltmeter or device having a movable needle, of a pair of tactors, means for repeatedly moving either tactor into and out of the path of the needle while the other is held out of such path, and means called into action by the engagement of the active tactor with the needle ($a$) to render such tactor idle, ($b$) to call into action a controlling-device, and ($c$) to cause the other tactor to become active.

60. The combination with an indicator movable in accordance with fluctuations in the condition of an apparatus, of a pair of tactors, prime moving means for causing the tactors to move into the path of the indicator, and means for enabling said needle to coöperate with said tactors in alternation to regulate the condition of said apparatus.

61. An electrically operating regulator, comprising a voltmeter having a movable needle, a pair of members active in alternation and caused to dip repeatedly into the path of said needle, and regulating means caused to reciprocate by the coöperation of said needle alternately with said dipping members.

62. The combination with a voltmeter having a movable needle, of a pair of tactors independently mounted to permit either to move while the other is motionless, prime-moving means for causing either tactor to beat into the path of said needle, and a regulating or controlling device called into action by reason of the contact of the active tactor with the needle.

63. The combination with a voltmeter including a needle, of a pair of tactors, a prime mover having means to cause the tactors to beat into the path of the needle, a regulating device reciprocable by said prime mover, and means to enable the needle to coöperate alternately with said tactors to reciprocate said regulating device.

64. A heat-regulating apparatus, including a voltmeter having a needle, and also including a regulating mechanism which has a duplex device caused by a prime mover to dip repeatedly into the path of said needle, and means controlled by the needle in coöperation with said duplex device for causing the heat to advance until the needle is carried within the field of said duplex member, and to maintain the heat at such point as to keep the needle within such field.

65. A heat controlling apparatus comprising an indicator caused to move by variation in the heat which is to be regulated, a reciprocatory heat-regulating device, a prime mover, a pair of tactors either of which is movable by said prime mover into the path of the needle while the other tactor is idle, and means for enabling either tactor by coöperation with said indicator to render itself inactive, to cause the other tactor to become active, and to move said regulating device in a direction opposite to that of its last movement.

66. The combination of a reciprocatory prime mover, a regulator device, an interponent between said elements caused to reciprocate by said prime mover and capable at the terminal portions of its strokes of operating said regulating device to and fro, and a tactor-and-indicator mechanism to control said interponent and including a pair of tactors caused by said interponent to dip into and out of the path of a movable indicator, and having means effective at such dipping movement to limit the stroke of said interponent and thereby prevent the operation of said regulating device.

67. The combination of a reciprocatory prime mover, a regulator device, an interponent between said elements caused to reciprocate by said prime mover and capable at the terminal portions of its strokes of operating said regulating device to and fro, and a tactor-and-indicator mechanism to control said interponent and including a pair of tactors caused by said interponent to dip into and out of the path of the movable indicator, and having means effective at such dipping movement to limit the stroke of said interponent and thereby prevent the operation of said regulating device; said limiting means constructed to be arrested and rendered ineffective by the engagement of the indicator with either tactor, and said interponent having means to latch the arrested tactor out of action and cause the other tactor to become active.

68. The combination of an active prime mover, a pair of tactors, means to latch each tactor to prevent its operation and to connect the other tactor to said prime mover to be rendered active thereby, said prime mover having means to move the active tactor out of the path of a movable indicator, and permitting it to fall back into said path, and a regulating mechanism reciprocable by said prime mover, said tactors having means rendered effective at their movements into the path of said indicator to prevent the operation of said regulating mechanism by said prime mover, the parts constructed to cause the prime mover to move said regulating mechanism in one direction when one tactor is arrested by said indicator, and in the opposite direction when the other tactor is arrested by said indicator.

69. The combination with an indicator, of a device for regulating an apparatus whose condition is shown by said indicator, a pair of tactors provided with latching means, a prime mover capable of causing either tactor to beat into and out of the path of said indicator, and means for enabling said indicator to coöperate with either tactor to latch the latter and release the other tactor, and also to control the movement of said regulating device.

70. The combination of a prime mover, a movable indicator, a pair of tactor devices, springs tending to move said tactor devices into the path of said indicator, an interponent between said prime mover and said tactor devices, said interponent having rests or stops against which the tactor devices may respectively be pressed by said springs, said interponent movable by the prime mover to withdraw the stops and permit the springs to move the tactor devices into the path of said indicator, one of said tactor devices having means coöperating with the indicator to arrest the movement of said interponent in one direction, and the other tactor device having corresponding means to arrest the movement of said interponent in the opposite direction; means effective when the indicator arrests the active tactor device, for prolonging the movement of said interponent in either direction and causing the active tactor device to become dormant and the other tactor device to become active, and a regulator reciprocable by said interponent at such prolonged movements thereof.

71. The combination with an indicator movable to show the condition of an apparatus, of a pair of tactors, a reciprocating prime mover, springs tending to move said tactors into the path of said indicator, an interponent between said prime mover and said tactors, said interponent having rests or stops, and said tactors having sears which may be caused by said springs to engage said stops respectively, latches to hold either tactor out of use, said interponent being movable by said prime mover to withdraw the stops to permit the active tactor to be moved by its spring into the path of said indicator, a double-acting spring connected to said interponent to prolong its movements, said interponent having stops engageable respectively by said sears to limit the movement of the interponent in opposite directions, and regulating means controlling said apparatus and reciprocable by said interponent when liberated from the active sear by reason of the arrest of the active tactor by said indicator; means being controlled by said interponent to latch the active indicator out of use and unlatch the dormant tactor and sear.

72. The combination with a movable indicator, of a pair of tactors, a prime mover having means to cause the tactors to move into and out of the path of the indicator, and means for enabling the indicator to coöperate with the tactors in alternation to switch the prime mover from one tactor to the other and also effect alternative movements of a regulating device.

73. The combination with a movable indicator, of a pair of tactors, a prime mover having means to cause the tactors to move into and out of the path of the indicator, and means for enabling the indicator to coöperate with the tactors in alternation to switch the prime mover from one tactor to the other and also effect alternative movements of the regulating device, interponents being provided between the tactors and the prime mover to control the tactors, means being provided to enable the tactors when moving into the path of the indicator to arrest their interponents, means being also provided to prolong the movements of the interponents when the tactors are arrested by the indicator, and said regulator being caused to operate at such prolonged movements.

74. The combination with a movable indicator, of a prime mover, trains of mechanism ramifying from said prime mover and terminating in a pair of tactors movable by said prime mover into the path of said indicator, and means for enabling the indicator to coöperate with either train to render it inactive and the other train active, and to shift a regulating device to an alternative position.

75. The combination with a movable indicator, of a prime mover, trains of mechanism ramifying from said prime mover and terminating in a pair of tactors movable by said prime mover into the path of said indicator, means for enabling the indicator to coöperate with either train to render it inactive and the other train active, and to shift a regulating device to an alternative position, each train including a sear connected to said tactor, and a tumbler or interponent having a stop or rest against which the sear is pressed by a spring, the tumbler being operable by said prime mover to permit the spring to move the tactor into the path of the indicator, and the tumbler also having a stop to be engaged by the sear at such movement of the tactor, and a spring to prolong the movement of the tumbler when the tactor is arrested by the indicator; the regulating device being shiftable by said tumbler at such prolonged movement.

76. The combination of an indicator, a double rocker or tumbler, a double-acting spring to hold said rocker in opposite normal positions, a prime mover having means for moving said rocker from either normal position to carry the spring past the dead point, trains of mechanism ramifying from said double rocker and each including a tactor and a connected sear, springs tending to move said tactors into the path of said indicator, means controlled by each rocker to permit its tactor to dip into the path of the needle at the initial portion of the actuation of the rocker by said prime mover, stops provided upon said rocker to enable it to be arrested, after passing the dead center, by the active sear, and a regulating device shiftable to alternative positions by said rocker at the prolonged movements thereof in opposite directions caused by said double-acting spring upon the failure of the active sear to arrest the rocker, by reason of the arrest of the active tactor by the indicator.

77. The combination of an indicator, a double rocker or tumbler, a double-acting spring to hold said rocker in opposite normal positions, a prime mover having means for moving said rocker from either normal position to carry the spring past the dead point, trains of mechanism ramifying from said double rocker and each including a tactor and a connected sear, springs tending to move said tactors into the path of said indicator, means controlled by each rocker to permit its tactor to dip into the path of the needle at the initial portion of the actuation of the rocker by said prime mover, stops provided upon said rocker to enable it to be arrested, after passing the dead center, by the active sear, and a regulating device shiftable to alternative positions by said rocker at the prolonged movements thereof in opposite directions caused by said double-acting spring upon the failure of the active sear to arrest the rocker, by reason of the arrest of the active tactor by the indicator, and a double latch movable in opposite directions by said rocker during the prolonged movement of the latter, to latch the arrested tactor and sear and release the other tactor and sear.

78. The combination with a movable indicator, of a pair of tactors adjustable along the path of movement of the indicator, means for moving either tactor repeatedly into and out of the path of the indicator, and means called into action by reason of the contact of either tactor with the indicator, for rendering the arrested tactor inactive and the other tactor active, and for moving a regulating device to an alternative position.

79. The combination with a movable indicator, of a pair of tactors, a finger-piece having means for adjusting said tactors together along the path of the indicator, means to hold either tactor out of the path of the indicator, means to cause either tactor to beat into said path, and means rendered effective by the contact of the active tactor with said indicator to render such arrested tactor inactive and to cause the other tactor to become active, and to move a regulating device to an alternative position.

80. The combination with a movable indicator, of a pair of tactors, a finger-piece having means for adjusting said tactors together along the path of the indicator, means to hold either tactor out of the path of the indicator, means to cause either tactor to beat into said path, and means rendered effective by the contact of the active tactor with said indicator to render such arrested tactor inactive and to cause the other tactor to become active, and to move a regulating device to an alternative position; said tactors being connected to their operating devices and to said regulating device by loose connections, to permit the tactors to be adjusted along the path of the indicator.

81. The combination with means, including a movable indicator, to indicate the condition of an apparatus, of a pair of tactors, a prime mover for causing either tactor to beat into the path of the needle, a support upon which said tactors are mounted, a finger-piece connected to said support to adjust the tactors along the path of the indicator, said tactors loosely connected to the prime mover and to means for enabling either tactor to become inactive when arrested by the indicator and to render the other tactor active, and a regulating device for said apparatus actuable by said prime mover and caused thereby to move to an alternative position when either tactor is arrested by the indicator.

82. The combination with an apparatus to be regulated, of an indicator movable to show the condition of said apparatus, and means, including a pair of tactors adjustable along the path of said indicator and provided with means whereby either may be caused to beat into said path, for causing the condition of said apparatus to change to a predetermined degree or point and to be maintained close to such predetermined point.

83. The combination with an indicating instrument provided with a movable needle, of a pair of tactors, means for causing either tactor to beat into the path of the needle, means for effecting relative adjustment between said instrument and said tactors in a direction corresponding with the path of movement of the needle, and means effective at any such adjustment for enabling either tactor, when arrested by engagement with the needle, to render itself inactive and the other tactor active and to shift a regulating device to an alternative position.

84. A heat regulating apparatus comprising an element or device whereby the heat produces an electrical current, a voltmeter connected to said element and having a needle or member to be moved by the current, a regulating mechanism including a pair of prime moving tactors to dip repeatedly into the path of said needle, and means for enabling said needle to coöperate with said tactors in alternation at any desired point or field along the path of travel of the needle to effect alternative shifts of a heat-regulating member.

85. The combination with a movable indicator, of a pair of tactors mounted upon a common rotatable support to permit the tactors to be adjusted together along the path of said indicator, means loosely connected to said tactors adjacent to the axis of movement of said rotatable support for causing the tactors to beat into the path of the indicator, a regulating device called into alternative action by reason of the arrest of either tactor by the indicator, and means also called into action by such arrest for rendering the arrested tactor idle and the other tactor active.

86. The combination of a movable indicator, a regulatable apparatus whose condition is shown by said indicator, and means, including an adjustable tactor mechanism dipping repeatedly into the path of said indicator, for coöperating with said indicator to maintain the efficiency of said apparatus at any predetermined point.

87. The combination of a movable indicator, a regulatable apparatus whose condition is shown by said indicator, and a prime moving tactor mechanism dipping repeatedly into the path of said indicator and having both means to coöperate with said indicator when the latter reaches a predetermined point in its forward movement, for changing the condition of said apparatus in one way, and also means to coöperate with said indicator when the latter reaches a predetermined point in its retrograde movement, for altering the condition of said apparatus in the opposite way; said tactor mechanism and said indicator instrument being relatively adjustable to vary the positions of such predetermined points.

88. The combination with an indicator movable in accordance with fluctuations in the condition of an apparatus, of a pair of tactors, prime moving means for causing the tactors to move into the path of the indicator, and adjustable means for enabling said indicator to coöperate with said tactors in alternation at any desired point or field in the path of movement of the indicator to regulate the condition of said apparatus.

89. An electrically operating regulator comprising a voltmeter having a movable needle, a pair of members active in alternation and caused to dip repeatedly into the path of said needle, regulating means caused to reciprocate by the coöperation of said needle alternately with said dipping members, and a finger-piece having means to effect simultaneous adjustment of said dipping members along the path of movement of said needle.

90. A heat-regulating apparatus including a voltmeter having a needle and also including a regulating mechanism which has a duplex device caused by a prime mover to dip repeatedly into the path of said needle, and means controlled by the needle in coöperation with said duplex device for causing the heat to advance until the needle is carried within the field of said duplex member, and to maintain the heat at such point as to keep the needle within such field; said voltmeter and said duplex device being relatively adjustable to determine the point or field of coöperation of the duplex device with the needle.

91. The combination of a reciprocatory prime mover, a pivoted tumbler provided with a double-acting spring and movable by said prime mover from either extreme position to carry the double-acting spring past the dead point, a pair of sears to engage stops on said tumbler to limit the opposite strokes thereof effected by said spring, a pair of tactors connected to said sears, a pair of springs tending to move said sears to positions to arrest said tumbler, and also to move said tactors into the path of a movable indicator, said tumbler having rests against which the sears are pressed by the springs when the tumbler is at its extreme positions, said rests so placed that the movements of the tumbler withdraw the rests and permit the sears to fall into positions to arrest the tumbler upon the passage of the dead center by the double-acting spring, each tactor being effective when arrested by the indicator, to trip its sear and permit a full stroke of the tumbler to be effected by the aid of the double-acting spring, a regulating valve or device movable to alternative positions by said tumbler when the sears are tripped as recited, and means operated by said tumbler to latch the arrested tactor and sear out of use and to release the other tactor and sear.

92. The combination with an apparatus to be regulated, of a prime mover, a regulating device operable by said prime mover, a movable indicator to indicate the condition of said apparatus, and means for enabling said indicator to control the actuation of said regulating device by said prime mover.

93. The combination with a furnace and a voltmeter therefor having a movable needle, of a valve to control the supply of fuel to the furnace, and a prime moving tactor mechanism including two tactors to beat repeatedly into the path of the needle to coöperate therewith in alternation; one tactor having means to coöperate with said needle to reduce the supply of fuel, and the other tactor having means to coöperate with said needle to increase the supply of fuel, and each tactor having means to coöperate with said needle to render itself inactive and the other tactor active.

94. The combination of a furnace, a pyrometer therein, a voltmeter connected to the pyrometer, a prime moving duplex tactor mechanism adjustable along the scale of the voltmeter, and a combined gas and air valve controlled by said tactor mechanism for regulating the supply of fuel to the furnace.

95. The combination with a voltmeter, of a pair of prime moving levers moving across the path of said needle and adjustable along said path, and a regulating or stopping-and-starting device controlled in alternation by said levers in coöperation with said needle.

96. A pilot valve mechanism to control the main fuel supply valve of a furnace, comprising a chest provided with a bore, a shell, as 45, fitted in the bore and peripherally recessed to coöperate with the wall of said bore to form an annular chamber to register with an admission orifice in the chest, the recessed or grooved wall of the shell being perforated to permit flow of air from said annular chamber into the interior of the shell, a valve fitting in said shell and recessed between its ends to form a stem as 97, connecting the valve proper 92 with the main valve rod 44; said shell also provided with a lower peripheral recess 98 to coöperate with the wall of said bore to form an inlet passage in register with a bore in the chest in communication with a diaphragm which controls said main supply valve; the wall of said shell being also perforated at the lower recess to permit the air entering the shell to pass out of the chest and lift said diaphragm; said valve being liftable to close communication between its inlet port and said diaphragm, and to open communication from said diaphragm to an exhaust provided in said chest.

97. A swiveled support provided upon a cover of a voltmeter box for a tactor lever of a controlling mechanism, said support in the form of a hollow or cup-like device sunken below the cover of the box and consisting of two parts joined together and formed to catch over the top and bottom edges of a circular hole formed in said cover, one part fitting in said hole and the latter being concentric to the rotation of the axis of the needle of the voltmeter, said tactor lever being connected to a sear by a universal joint in proximity to the axis of movement of said swiveled head or support, so that the head may be swung in either direction without disturbing the connection between the tactor lever and the sear lever.

98. A swiveled support provided upon a cover of a voltmeter box for a tactor lever of a controlling mechanism, said support in the form of a hollow or cup-like device sunken below the cover of the box and consisting of two parts joined together and formed to catch over the top and bottom edges of a circular hole formed in said cover, one part fitting in said hole and the latter being concentric to the rotation of the axis of the needle of the voltmeter, said tactor lever being connected to a sear by a universal joint in proximity to the axis of movement of said swiveled head or support, so that the head may be swung in either direction without disturbing the connection between the tactor lever and the sear lever, a segment of a worm wheel provided on the upper member of said head and a worm in mesh therewith and provided with a finger-piece to adjust the tactor lever to any desired point along the usual voltmeter scale.

99. The combination with a furnace having a supply of fuel-gas and compressed air and a voltmeter having an element in the furnace, of a tactor to beat into the path of the needle of the voltmeter, a prime mover connected to the compressed air supply to be operated by compressed air, an interponent between said prime mover and said tactor, and means to enable the tactor and needle to coöperate to cause said interponent to operate a valve to control passage of compressed air to the main valve which controls the supply of fuel-gas and compressed air to the furnace.

100. The combination with a voltmeter or device including a needle, of a tactor, a regulatable apparatus subject to variation which causes movement of said needle toward said tactor, a prime mover for causing said tactor to beat into the path of the needle, means called into action by reason of the contact of the tactor with the needle to regulate or control said apparatus, and means for regulating the speed of said prime mover.

101. An electrically-operating regulator comprising a voltmeter or the like having a needle movable by the current passing through the voltmeter, a member caused to dip into the path of said needle, and regulating means rendered effective whenever said dipping member engages said needle.

102. An electrically-operating regulator comprising a voltmeter or the like having a needle movable by the current passing through the voltmeter, a member caused to dip into the path of said needle, and regulating means rendered effective whenever said dipping member engages said needle, a support being provided to sustain said needle against the pressure of said dipping member.

103. The combination with an apparatus to be regulated, and a member connected to the apparatus and moved thereby to indicate the condition of the apparatus, of a regulating mechanism including a part caused to beat into and out of the path of said indicating member, and means rendered effective whenever said beating part engages said indicating member, for effecting the desired regulation.

104. The combination with an apparatus to be regulated, of a voltmeter or the like connected to said apparatus and having a member movable by the apparatus to indicate the condition thereof, and a regulating mechanism including a part caused to dip repeatedly into the path of said indicating member, and means for effecting the desired regulation when said dipping part engages said indicating member.

105. The combination with a heating apparatus, of a voltmeter or the like connected thereto and including a movable needle and tactor, means for causing said tactor to dip into the path of said needle, and a regulating or controlling device rendered effective whenever the tactor engages the needle.

106. The combination with a voltmeter or the like having a needle or indicating member, of a tactor, a regulatable apparatus subject to variations which causes progressive movement of said needle toward said tactor, a prime mover for causing said tactor to beat into the path of the needle, and means for regulating or controlling said apparatus when said tactor engages the needle.

107. The combination with a voltmeter or the like having a movable needle, of a support for the point of said needle, a tactor toward which said needle is progressively moved by the current passing through the voltmeter, means for moving said tactor repeatedly into and out of the path of the needle in proximity to said support, and a controlling device called into action whenever the tactor presses the needle against said support.

108. The combination with a voltmeter or the like including a needle movable by the current passing through the voltmeter, of a tactor, means for adjusting the tactor to different points along the path of movement of the needle, means for moving the tactor repeatedly into and out of the path of the needle, and a controlling device called into action whenever the tactor engages the needle.

109. The combination with an indicator, of a part caused by a prime mover to beat into and out of the path of said indicator, an apparatus having means to move said indicator progressively toward said beating part, and means to effect the desired regulation whenever said beating part engages said indicator; said beating part being adjustable along the path of the indicator to determine the point in the movement of the indicator at which the regulation shall be effected.

110. The combination of an indicator, a regulatable apparatus having means to cause progressive movement of said indicator in opposite directions to show the condition of said apparatus, and means to maintain the efficiency of said apparatus at a predetermined point, including a tactor mechanism to dip repeatedly into the path of said indicator, and regulating devices called into operation whenever contact is effected between said tactor mechanism and said indicator.

GEORGE MACHLET, Jr.

Witnesses:
 FRITZ W. MACHLET,
 SAMUEL R. OGDEN.